(12) United States Patent
Nakazono et al.

(10) Patent No.: US 10,453,166 B2
(45) Date of Patent: Oct. 22, 2019

(54) IMAGE PROCESSING DEVICE AND IMAGE PROCESSING METHOD

(71) Applicant: OLYMPUS CORPORATION, Hachioji-shi, Tokyo (JP)

(72) Inventors: Keisuke Nakazono, Tokyo (JP); Akira Ueno, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 5 days.

(21) Appl. No.: 15/810,481

(22) Filed: Nov. 13, 2017

(65) Prior Publication Data

US 2018/0068413 A1 Mar. 8, 2018

Related U.S. Application Data

(63) Continuation of application No. PCT/JP2016/060147, filed on Mar. 29, 2016.

(30) Foreign Application Priority Data

Jun. 12, 2015 (JP) ................ 2015-119685

(51) Int. Cl.
*G06T 1/20* (2006.01)
*G06F 13/16* (2006.01)
(Continued)

(52) U.S. Cl.
CPC .............. *G06T 1/20* (2013.01); *G06F 9/38* (2013.01); *G06F 13/1673* (2013.01);
(Continued)

(58) Field of Classification Search
CPC ......... G06T 1/20; G06T 15/005; G06T 15/04; G09G 5/363; G09G 5/393
See application file for complete search history.

(56) References Cited

U.S. PATENT DOCUMENTS

2010/0328690 A1 12/2010 Yamada et al.
2012/0050259 A1* 3/2012 Solomonov .......... G06T 15/005
345/419
2012/0110224 A1* 5/2012 Tanaka ..................... G06F 5/06
710/57

FOREIGN PATENT DOCUMENTS

JP 5-181817 A 7/1993
JP 7-302201 A 11/1995
(Continued)

OTHER PUBLICATIONS

International Search Report dated Apr. 26, 2016, issued in counterpart of International Application No. PCT/JP2016/060147 (4 pages).

*Primary Examiner* — Todd Buttram
(74) *Attorney, Agent, or Firm* — Westerman, Hattori, Daniels & Adrian, LLP

(57) ABSTRACT

There is provided an image processing device includes an image processing section including a pipeline in which a plurality of processing modules is connected in series, and a system control section performing setting the pipeline processing to be performed by the image processing section. Each of the processing modules includes a data buffer temporarily store the data, on arithmetic section configured to perform an arithmetic operation of the process according to a setting of processing content by the system control section, and a control section configured to select a data transfer path within the processing module and control an operation of the data buffer according to a setting of a data transfer path by the system control section. The image processing section further includes a connection switching section configured to switch a connection between the processing modules according to a setting of a pipeline configuration by the system control section.

8 Claims, 12 Drawing Sheets

(51) Int. Cl.
  *G06F 13/40*  (2006.01)
  *G06F 13/28*  (2006.01)
  *G06T 3/40*  (2006.01)
  *H04N 5/357*  (2011.01)
  *G06F 13/38*  (2006.01)
  *G06F 15/173*  (2006.01)
  *G06F 9/38*  (2018.01)
  *G06T 1/60*  (2006.01)

(52) U.S. Cl.
  CPC .............. *G06F 13/28* (2013.01); *G06F 13/38* (2013.01); *G06F 13/4022* (2013.01); *G06F 15/173* (2013.01); *G06T 1/60* (2013.01); *G06T 3/4007* (2013.01); *H04N 5/357* (2013.01); *Y02D 10/14* (2018.01); *Y02D 10/151* (2018.01)

(56) References Cited

FOREIGN PATENT DOCUMENTS

| | | |
|---|---|---|
| JP | 10-334225 A | 12/1998 |
| JP | 2011-28738 A | 2/2011 |
| JP | 2012-98883 A | 5/2012 |

\* cited by examiner

IMAGE PROCESSING DEVICE AND IMAGE PROCESSING METHOD

This application is a continuation application based on a PCT Patent Application No. PCT/JP2016/060147, filed on Mar. 29, 2016, whose priority is claimed on Japanese Patent Application No. 2015-119685, filed Jun. 12, 2015, the content of which are incorporated herein by reference.

TECHNICAL FIELD

The present invention relates to on image processing device and an image processing method.

BACKGROUND ART

In many image processing devices such as a system LSI mounted on an imaging device such as a still image camera, a moving image camera, a medical endoscope camera, or an industrial endoscope camera, one connected dynamic random access memory (DRAM) is shared by a plurality of built-in processing blocks. In such a system LSI, the plurality of built-in processing blocks are connected to a data bus inside the system LSI, and each processing block accesses the DRAM in direct memory access (DMA).

Also, there are processing blocks that include a plurality of processing modules and perform pipeline processing by the processing modules being connected in series among the processing blocks provided in such a system LSI. For example, in a system LSI provided in an imaging device, an image processing section that performs image processing is a processing block that performs pipeline processing. In addition, the image processing section implements high-speed image processing in the image processing section according to pipeline processing in which a plurality of image processing modules that perform image processing are connected in series. Generally, a data buffer which delivers data between the processing modules is provided in a processing block having a plurality of processing modules configured to perform the pipeline processing, a delay of processing in each processing module is absorbed by the data buffer and the pipeline processing can be performed normally.

For example, Japanese Unexamined Patent Application, First Publication No. H10-334225 discloses technology of an image processing device having a pipeline configuration in which a double buffer, which is a data buffer, is provided between processing stages which are processing modules. In the image processing device disclosed in Japanese Unexamined Patent Application, First Publication No. H10-334225, the pipeline processing in which processing by each processing stages is sequentially performed, by delivering data between the processing stages via the double buffer is implemented.

In the image processing device disclosed in Japanese Unexamined Patent Application, First Publication No. H10-334225, data processed by a previous processing stage is temporarily stored in the double buffer and the data stored in the double buffer is read by a subsequent processing stage, so that the data is delivered from the previous processing stage to the subsequent processing stage. That is, in the image processing device disclosed in Japanese Unexamined Patent Application, First Publication No. H10-334225, when data is delivered from the previous processing stage to the subsequent processing stage, writing of data to the double buffer by the previous processing stage and reading of data from the double buffer by the subsequent processing stage are necessarily performed.

SUMMARY OF INVENTION

Solution to Problem

According to a first aspect of the present invention, an image processing device is an image processing device includes a memory, an image processing section and a system control section, the memory and the image processing section being connected to a data bus, the image processing section including a pipeline in which a plurality of processing modules is connected in series, each processing modules being configured to perform a predetermined process on input data, the image processing section performing pipeline processing by the processing modules sequentially performing the process, and the system control section performing setting the pipeline processing to be performed by the image processing section, wherein each of the processing modules includes: a data buffer configured to temporarily store the data in unit of processing, an arithmetic section configured to perform an arithmetic operation of the process in accordance with a setting of processing content by the system control section, and a control section configured to select a path within the processing module by which the data is transferred to the arithmetic section and control an operation of the data buffer in accordance with a setting of a data transfer path by the system control section, and wherein the image processing section further includes: a connection switching section configured to switch a connection between the processing modules constituting the pipeline in accordance with a setting of a pipeline configuration by the system control section.

According to a second aspect of the present invention, in the image processing device of the above-described first aspect, at least one processing module among the plurality of processing modules may be a second processing module including a second arithmetic section which is the arithmetic section for exclusively performing arithmetic operations of a plurality of predetermined processes, and the system control section may perform the setting of the transfer path and the setting of the pipeline configuration on the basis of contents of the process to be performed on the data by the second processing module and a storage capacity of the data buffer provided in the processing module connected adjacent to the second processing module.

According to a third aspect of the present invention, in the image processing device of the above-described second aspect, the system control section may sets the second arithmetic section and the arithmetic section provided in the adjacently connected processing module as a single arithmetic section if remaining storage capacity in the data buffer is present when the second processing module performs the arithmetic operation of the process according to the setting of the processing content, the system control section may sets the transfer path of the adjacently connected processing module to a path along which the data bypasses the data buffer and transferred to the arithmetic section without being stored in the data buffer, and causes an operation of the data buffer provided in the adjacently connected processing module to stop if the remaining storage capacity is a capacity available instead of the storage capacity of the data buffer provided in the adjacently connected processing module, and the system control section may sets the transfer path of the adjacently connected processing module to a path along which the data is read and transferred to the arithmetic section after being temporarily stored in the data buffer if the remaining storage capacity is a capacity unavailable instead of the storage capacity of the data buffer provided in the adjacently connected processing module.

According to a fourth aspect of the present invention, in the image processing device of the above-described third aspect, the system control section may calculates the remaining storage capacity of the data buffer provided in the second processing module on the basis of the entire storage capacity of the data buffer and the storage capacity of the data buffer used when the second processing module performs the arithmetic operation of the process according to the selling of the processing content.

According to a fifth aspect of the present invention, in the image processing device of the above-described second aspect, the processing module and the second processing module may further include a selector configured to select either a path along which the data read from the data buffer is transferred or a path along which the data is transferred by bypassing the data buffer, as a path along which the data is transferred.

According to a sixth aspect of the present invention, in the image processing device of the above-described second aspect, the data may be pixel data corresponding to each pixel included in an image, the second arithmetic section may be an arithmetic section for exclusively performing arithmetic operations of a plurality of processes according to an image interpolation process using a function of converting coordinates of each pixel included in the image, and the system control section may calculates the remaining storage capacity of the data buffer provided in the second processing module on the basis of the entire storage capacity of the data buffer and the storage capacity of the data buffer used when the second processing module performs the arithmetic operation of the image interpolation process according to a setting value of the image interpolation process.

According to a seventh aspect of the present invention, in the image processing device of the above-described sixth aspect, the image interpolation process may include at least a resizing process for changing a size of the image and a distortion correction process of correcting distortion of distortion aberration included in the image.

According to an eighth aspect of the present invention, in the image processing device of the above-described second aspect, the processing module connected adjacent to the second processing module may be connected to a stage subsequent to the second processing module in the pipeline configuration.

According to a ninth aspect of the present invention, an image processing method is an image processing method in an image processing device includes a memory, an image processing section and a system control section, the memory and the image processing section being connected to a data bus, the image processing section including a pipeline in which a plurality of processing modules is connected in series, each processing modules being configured to perform a predetermined process on input data, the image processing section performing pipeline processing by the processing modules sequentially performing the process, and the system control section performing setting the pipeline processing to be performed by the image processing section, the image processing method including: an arithmetic step, by each of the processing modules, performing an arithmetic operation of the process in according to a setting of processing content by the system control section; a control step, by each of the processing modules, selecting a path within the processing module by which the data is transferred to the arithmetic section and controlling an operation of a data buffer configured to temporarily store the data in unit of processing in accordance with a setting of a data transfer path by the system control section: and a connection switching step, by the image processing section, switching a connection between the processing modules constituting the pipeline in accordance with a setting of a pipeline configuration by the system control section.

DESCRIPTION OF EMBODIMENTS

Figure 1:
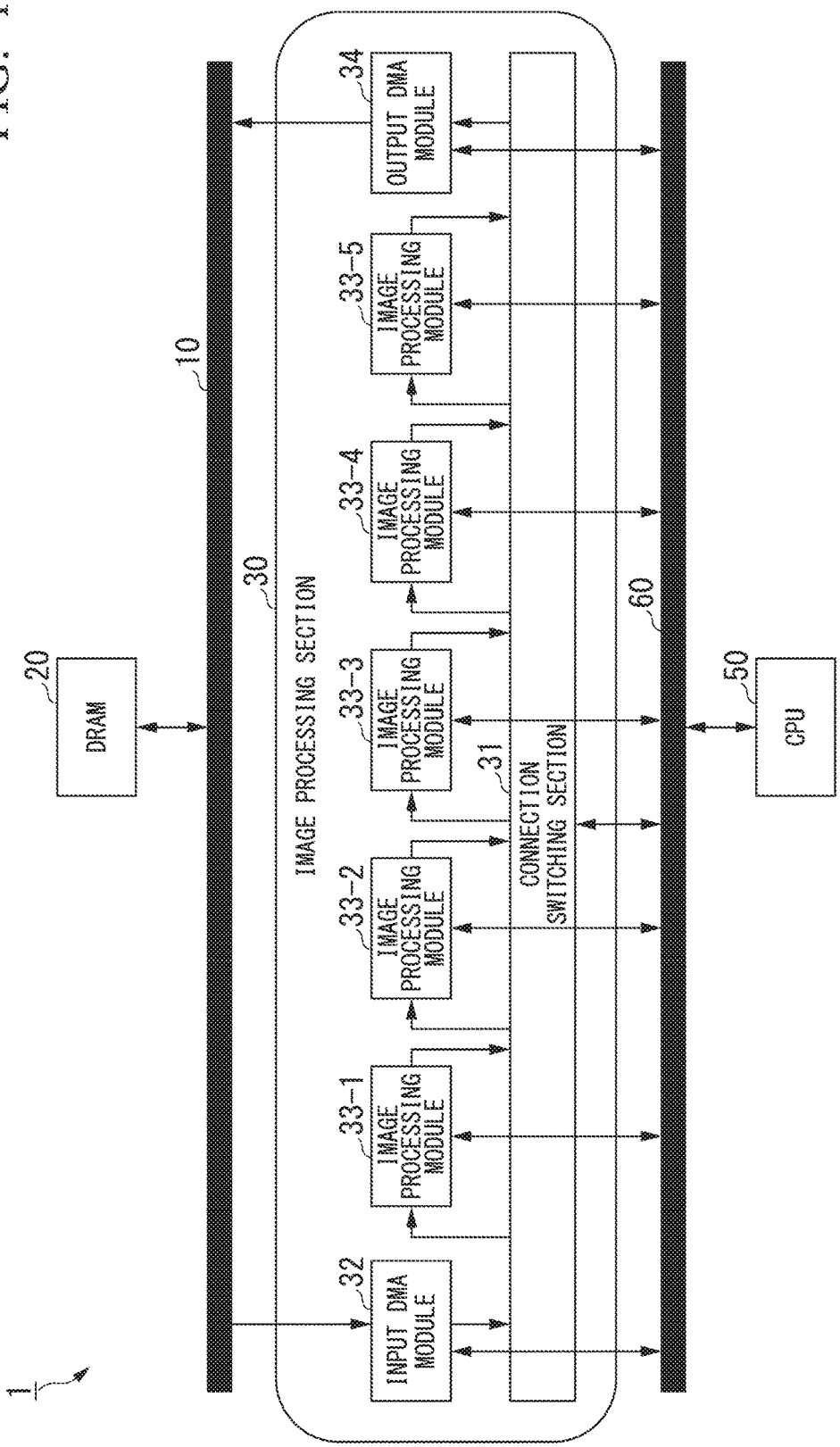
FIG. 1 is a block diagram showing a schematic configuration of an image processing device in an embodiment of the present invention.

Hereinafter, an embodiment of the present invention is described with reference to the drawings. FIG. 1 is a block diagram showing a schematic configuration of an image processing device in the embodiment of the present invention. The image processing device 1 shown in FIG. 1 includes a DMA bus 10, a DRAM 20, an image processing section 30, a CPU (central processing unit) bus 60, and a CPU 50. Also, the image processing section 30 includes a connection switching section 31, an input DMA module 32, five image processing modules 33-1 to 33-5, and an output DMA module 34. The image processing device 1 is provided in an imaging device such as, for example, a still image camera.

In FIG. 1, the illustration of other component elements provided in the image processing device 1 and connected to one or both of the DMA bus 10 and the CPU bus 60 is omitted. For example, other component elements included in the image processing device 1 are an imaging processing section for controlling a solid-state imaging device that photoelectrically converts an optical image of a subject formed by a lens provided in the imaging device, a recording processing section for performing a recording process of recording data of an image processed by the image processing section 30, and a display processing section for displaying the data of the image processed by the image processing section 30 on a display unit provided in the image processing device 1.

The DRAM 20 is connected to the DMA bus 10 and stores various data to be processed in the imaging device. For example, the DRAM 20 stores data of a still image output from a solid-state imaging device (not shown) provided in the imaging device. In the image processing device 1, data of a still image of one frame stored in the DRAM 20 is divided into a plurality of predetermined small blocks, and the image processing section 30 performs image processing for each block.

The CPU 50 is a system control section that is connected to the CPU bus 60 and controls each component element included in the image processing device 1 and the component elements provided in the imaging device. The CPU 50 controls the entire imaging device in accordance with programs and data for controlling the component elements. Also, the programs and data for enabling the CPU 50 to control the entire imaging device are read from the DRAM 20 connected to the DMA bus 10 via a bus connection section (not shown) which connects the DMA bus 10 to the CPU bus 60.

As shown in FIG. 1, the image processing section 30 sequentially performs image processing in the image processing device 1 according to pipeline processing in which the input DMA module 32, the image processing modules 33-1 to 33-5, and the output DMA module 34 are connected together in series. The contents and operations of the image processing performed by the image processing section 30 are controlled (set) by the CPU 50 connected via the CPU bus 60. For example, a processing mode of the image processing to be performed by the image processing section 30, values (parameters) such as a filter coefficient and a distortion coefficient when the image processing is performed, and a configuration and an operation of the data buffer in the image processing section 30, and the like are set by the CPU 50.

In the following description, data included in each block obtained by dividing data of a still image of one frame is referred to as "block image data". The image processing section 30 reads data of each pixel (hereinafter referred to as "pixel data") included in the block image data, for example, from the DRAM 20 for every predetermined number of columns, and performs image processing using the read pixel data as a one unit of processing. In the following description, a plurality of pieces of consecutive pixel data included in the same column in pixel data of one unit of processing in which the image processing section 30 performs the image processing is referred to as a "unit line".

The image processing section 30 has a function of selecting image processing to be performed on data of a still image of one frame. More specifically, the image processing section 30 can sequentially perform image processing by each of the image processing modules 33-1 to 33-5, and can perform image processing by one or more of the image processing modules 33-1 to 33-5, or perform image processing by changing the order of the image processing modules 33-1 to 33-5. In the following description, each of the image processing modules 33-1 to 33-5 is referred to as an "image processing module 33" when each of the image processing modules 33-1 to 33-5 is indicated without distinguishing.

The connection switching section 31 switches an output destination of the image data output by each of the component elements provided in the image processing section 30, that is, switches a connection between the component elements provided in the image processing section 30. For example, if the image processing section 30 performs image processing of only the image processing module 33-2, a connection of each component element is switched so that an output terminal of the input DMA module 32 and an input terminal of the image processing module 33-2 are connected, and an output terminal of the image processing module 33-2 and an input terminal of the output DMA module 34 are connected. Also, for example, if image processing is performed by the image processing section 30 in the order of the image processing module 33-5 and the image processing module 33-1, a connection of each component element is switched so that an output terminal of the input DMA module 32 and an input terminal of the image processing module 33-5 are connected, an output terminal of the image processing module 33-5 and an input terminal of the image processing module 33-1 are connected, and an output terminal of the image processing module 33-1 and an input terminal of the output DMA module 34 are connected. Also, the connection switching section 31 switches a connection of each component element provided in the image processing section 30 in accordance with control from the CPU 50 connected via the CPU bus 60.

The input DMA module 32 is a processing module for reading pixel data included in the block image data stored in the DRAM 20 for each unit line, and outputting the read pixel data to any image processing module 33 which is a processing module for performing image processing the next time via the connection switching section 31. The input DMA module 32 reads pixel data from the DRAM 20 via the DMA bus 10 in accordance with control from the CPU 50 connected via the CPU bus 60, and outputs the read pixel data to the image processing module 33 of a connection destination to which a connection is switched by the connection switching section 31.

The input DMA module 32 includes a data buffer capable of temporarily storing pixel data for a predetermined number of unit lines. Thus, the input DMA module 32 can temporarily store the pixel data read from the DRAM 20 via the DMA bus 10 in the data buffer, and output the pixel data temporarily stored in the data buffer to the image processing module 33 of a connection destination to which a connection is switched by the connection switching section 31.

Each of the image processing modules 33-1 to 33-5 is a processing module for performing various predetermined digital image processing on the pixel data input from the input DMA module 32 or the image processing module 33 of a connection destination to which a connection is switched by the connection switching section 31 via the connection switching section 31. Each of the image processing modules 33-1 to 33-5 performs image processing on the pixel data input via the connection switching section 31 in accordance with control from the CPU 50 connected via the CPU bus 60, and outputs the pixel data subjected to the image processing to the image processing module 33 or the output DMA module 34 of a connection destination to which a connection is switched by the connection switching section 31.

The image processing performed by each of the image processing module 33-1 to the image processing module 33-5 includes various image processing. The image processing performed by each of the image processing modules 33-1 to 33-5 includes, for example, YC processing for generating a Y (luminance) signal and a C (color) signal corresponding to each the pixel data, a noise reduction process for reducing noise included in each the pixel data, LPF processing for suppressing high frequency components in images represented by each the pixel data, an edge enhancement process for enhancing a contour of a subject in the image, and the like. Also, the image processing performed by each of the image processing modules 33-1 to 33-5 may include, for example, an image interpolation process according to conversion of a position (coordinates) of each the pixel included in block image data. The image interpolation process may include, for example, a resizing process of changing (enlarging or reducing) a size of the image, a distortion correction process of correcting distortion such as lateral chromatic aberration and distortion aberration included in the image, a shape correction process of correcting a shape of the image such as trapezoidal correction, and the like. In this manner, in the image processing module 33, there are an image processing module 33 of a configuration having one predetermined image processing function, and also the image processing module 33 for exclusively performing a plurality of pieces of image processing by using the same processing function (a coordinate conversion function in the above-described example).

Also, each of the image processing modules 33-1 to 33-5 is also provided with a data buffer capable of temporarily storing pixel data of a predetermined number of unit lines. In each of the image processing modules 33-1 to 33-5, whether or not to temporarily store the pixel data input via the connection switching section 31 in the data buffer is controlled by the CPU 50. For example, the CPU 50 performs control so that the data buffer provided in any one image processing module 33 is used as a data buffer of another image processing module 33 connected to the stage previous to or the stage subsequent to (his image processing module 33. That is, the CPU 50 can perform control in consideration of sharing of a data buffer provided in the image processing module 33 itself with a data buffer provided in another image processing module 33. A detailed description of a method of controlling the data buffer provided in each image processing module 33 by the CPU 50 will be provided below.

In the following description, pixel data after image processing is referred to as "processed pixel data" when the pixel data after the image processing is described in distinction from pixel data to be subjected to image processing stored in the DRAM 20.

The output DMA module 34 is a processing module for writing (storing) the processed pixel data input via the connection switching section 31 from the image processing module 33 of a connection destination to which a connection is switched by the connection switching section 31 to the DRAM 20. The output DMA module 34 outputs the processed pixel data input via the connection switching section 31 to the DRAM 20 via the DMA bus 10 in accordance with control from the CPU 50 connected via the CPU bus 60.

The output DMA module 34 also includes a data buffer capable of temporarily storing the processed pixel data for a predetermined number of unit lines. Thus, the output DMA module 34 can temporarily store the processed pixel data input via the connection switching section 31 in the data buffer and output the processed pixel data temporarily stored in the data buffer to the DRAM 20 via the DMA bus 10.

In this manner, in the image processing section 30, each processing module divides data of a still image of one frame into block image data and performs a series of image processing on each the block image data, for example, by sequentially performing image processing according to control from the CPU 50 connected via the CPU bus 60 on image data included in each the block image data for each unit line.

Next, a configuration and operation of each processing module provided in the image processing section 30 will be described. First, a method of delivering pixel data between processing modules provided in the image processing section 30 will be described.

Figure 2:
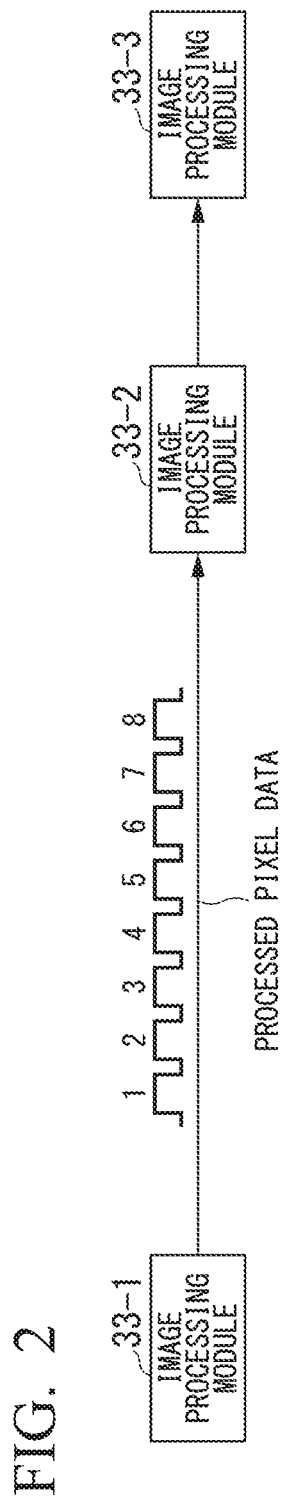
FIG. 2 is a diagram showing an example of a method of data transfer between image processing modules in an image processing section provided in the image processing device of the embodiment of the present invention.

FIG. 2 is a diagram showing an example of a method of data transfer between the image processing modules 33 in the image processing section 30 provided in the image processing device 1 of the embodiment of the present invention. In FIG. 2, an example in which the processed pixel data on which the image processing module 33-1 has performed image processing is output to the image processing module 33-2 is shown. As described above, in the image processing section 30, the pixel data output from each processing module is output to the processing module that performs the next processing via the connection switching section 31. However, in FIG. 2, illustration of the connection switching section 31 is omitted, and the processed pixel data is shown to be directly output from the image processing module 33-1 to the image processing module 33-2.

As described above, in the image processing section 30, each processing module performs image processing using a plurality of unit lines as one unit of processing. Thus, in the image processing section 30, the delivery of the pixel data between the processing modules provided in the image processing section 30 is also performed for each one unit of processing. In FIG. 2, a case in which the image processing module 33-1 of the previous stage outputs the processed pixel data of each of eight unit lines as one unit of processing to the image processing module 33-2 or the subsequent stage is shown. Also, one unit line includes a plurality of pieces of consecutive the processed pixel data included in the same column subjected to image processing.

In FIG. 2, although an example of a method of delivering (transferring) the processed pixel data between the image processing module 33-1 and the image processing module 33-2 is shown, a method of delivering pixel data between the input DMA module 32 and the image processing module 33 and a method of delivering the processed pixel data between the image processing module 33 and the output DMA module 34 are also similar to that of FIG. 2. Also, in FIG. 2, although an example in which the processed pixel data of each of the eight unit lines is delivered as one unit of processing is shown, the number of unit lines for performing delivery between processing modules is not limited to the number shown in FIG. 2, that is, 8.

(First Configuration)

Figure 3:
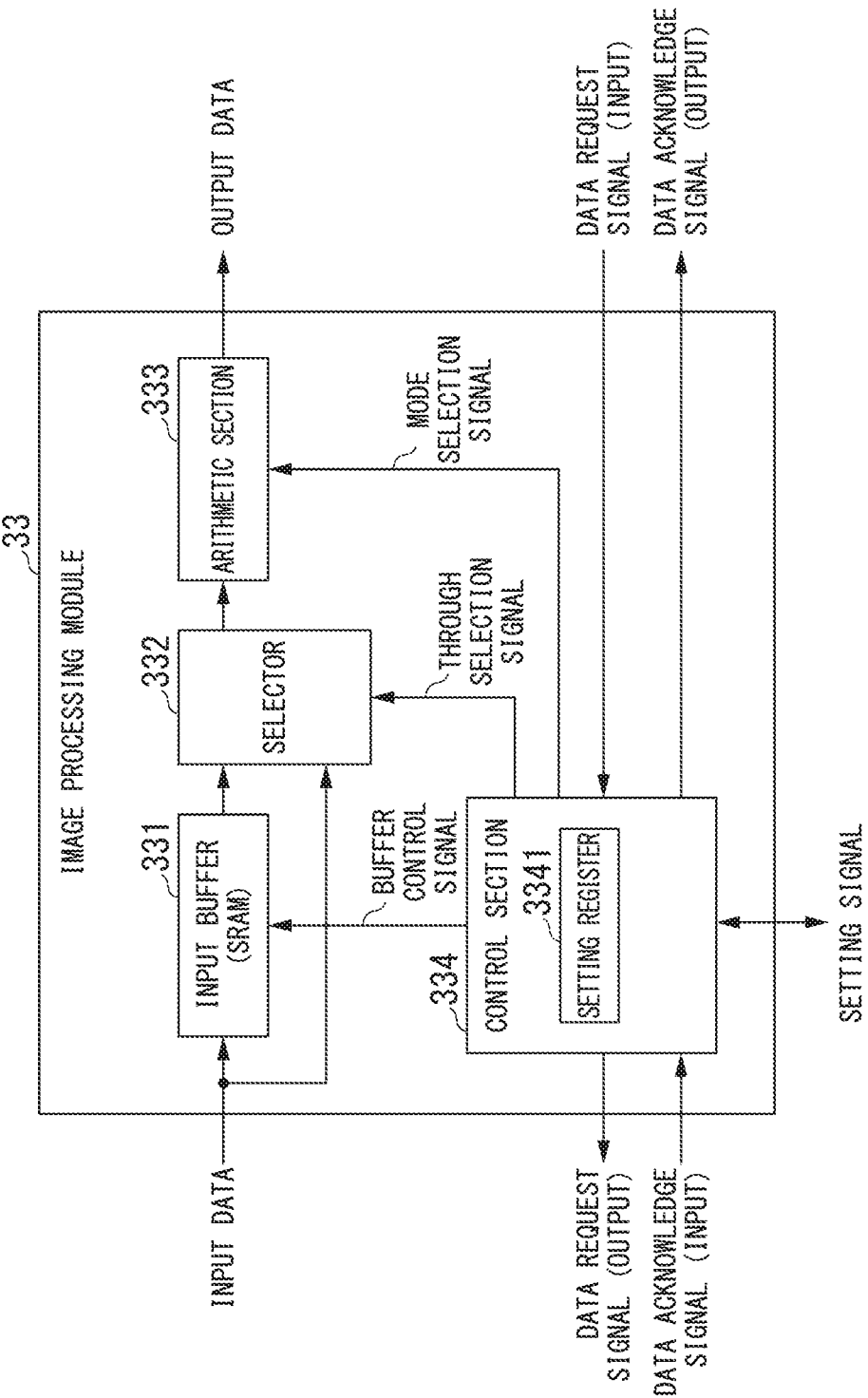
FIG. 3 is a block diagram showing a schematic configuration of the image processing module in the image processing section provided in the image processing device of the embodiment of the present invention.

Next, the first configuration of each processing module provided in the image processing section 30 will be described. The image processing module 33 of the first configuration is the image processing module 33 having a configuration provided with one predetermined arithmetic function of image processing. FIG. 3 is a block diagram showing a schematic configuration of the image processing module 33 in the image processing section 30 provided in the image processing device 1 of the embodiment of the present invention. In FIG. 3, a basic configuration of the image processing module 33 of the first configuration is shown. The image processing module 33 of the first configuration shown in FIG. 3 includes an input buffer 331, a selector 332, an arithmetic section 333, and a control section 334. Also, the control section 334 includes a setting register 3341.

The input buffer 331 is a data buffer that temporarily stores the input data input to the image processing module 33. The input buffer 331 is constituted of, for example, a memory such as a static random access memory (SRAM). The input buffer 331 has a storage capacity capable of enabling pixel data of a predetermined number of unit lines input from the processing module of the previous stage to be stored as input data. The input buffer 331 temporarily stores the input data, which has been input, in accordance with a buffer control signal input from the control section 334.

In the image processing module 33, the number of necessary unit lines differs according to the image processing performed on input data (pixel data) which has been input. The number of unit lines temporarily stored in the input buffer 331 provided in each image processing module 33, that is, the storage capacity of the input buffer 331, is predetermined on the basis of contents of the image processing performed by each image processing module 33, a delay time until the pixel data on which the image processing has been performed is output after pixel data is input to each image processing module 33, storage capacities of the input buffer 331 provided in the processing modules connected to a previous stage and a subsequent stage, a delay time thereof, and the like.

Also, the input buffer 331 may be constituted of a so-called double buffer which includes two storage capacity sets for storing pixel data (input data) for a predetermined number of unit lines and operates so that an input and an output of pixel data of one unit of processing can be simultaneously performed by alternately performing writing of pixel data to one storage capacity set and reading of pixel data from the other storage capacity set.

The selector 332 is a selection unit that selects pixel data to be output to the arithmetic section 333. The selector 332 selects either the input data (pixel data) temporarily stored in the input buffer 331 or the input data (pixel data) currently input to the image processing module 33 in accordance with a through selection signal input from the control section 334 and outputs the selected input data (pixel data) to the arithmetic section 333. That is, the selector 332 selects either the pixel data input from the processing module of the previous stage and temporarily stored in the input buffer 331 or the intact pixel data currently input from the processing module of the previous stage and transfers the selected pixel data to the arithmetic section 333.

The arithmetic section 333 performs an arithmetic operation of various predetermined digital image processing on the input pixel data. The arithmetic section 333 performs an arithmetic operation of image processing according to the mode selection signal input from the control section 334. The arithmetic section 333 outputs the processed pixel data generated by performing the arithmetic operation of image processing as output data outside the image processing module 33. That is, the arithmetic section 333 outputs the generated the processed pixel data to another image processing module 33 or the output DMA module 34 via the connection switching section 31.

The control section 334 controls exchange of input data (pixel data) with another processing module connected to the stage previous to the image processing module 33 and exchange of output data (the processed pixel data) with another processing module connected to the subsequent stage. At this time, the control section 334 outputs a state notification signal indicating an operation state of the image processing module 33 to the processing modules of the previous and subsequent stages.

Also, the control section 334 controls an operation of each component element in the image processing module 33 including the control section 334 itself on the basis of the setting stored in the setting register 3341 according to a setting signal input from the CPU 50. In the setting register 3341 stores (sets), by the CPU 50, a processing mode and parameters for performing an arithmetic operation of image processing performed by the arithmetic section 333, parameters for selecting input data (pixel data) to be input to the arithmetic section 333 via the selector 332, and the like. Then, the control section 334 outputs a through selection signal for selecting the path of input data (pixel data) according to the parameter of the selector 332 set in the setting register 3341 by the CPU 50 to the selector 332. Thereby, the selector 332 transfers the input data (pixel data) to the arithmetic section 333 along the path corresponding to the through selection signal. Also, the control section 334 also outputs a mode selection signal for performing an operation in accordance with the processing mode and the parameters of the arithmetic section 333 set in the setting register 3341 by the CPU 50 to the arithmetic section 333. Thereby, the arithmetic section 333 performs an arithmetic operation of image processing according to the mode selection signal to the input data (pixel data) input via the selector 332.

More specifically, if the parameter of the selector 332 set in the setting register 3341 by the CPU 50 indicates that the input data (pixel data) input to the image processing module 33 is to be temporarily stored, the control section 334 outputs a through selection signal for selecting the path for outputting the input data (pixel data) temporarily stored in the input buffer 331 to the arithmetic section 333 to the selector 332. Thereby, when the pixel data temporarily stored in the input buffer 331 is read by the control section 334, the selector 332 transfers the read pixel data to the arithmetic section 333. Then, the control section 334 controls the operation of the input buffer 331 according to whether or not there is free storage capacity in the input buffer 331.

If there is free storage capacity in the input buffer 331, the input buffer 331 is in a state in which it is possible to temporarily store the input data (pixel data) input to the image processing module 33. In this case, the control section 334 outputs a data request signal for requesting the output of input data (pixel data) as a state notification signal indicating that it is possible to receive the input data from the processing module of the previous stage, to the processing module of the previous stage. Then, when a data acknowledge signal indicating that input data (pixel data) has been output is input from the processing module of the previous stage in accordance with the output data request signal, the control section 334 generates the buffer control signal for performing control so that input data (pixel data) corresponding to the data acknowledge signal is received and temporarily stored (written), and outputs the generated buffer control signal to the input buffer 331. At this time, on the basis of a data validity signal input together with the input data (pixel data) from the processing module of the previous stage, the control section 334 determines whether or not the input data (pixel data) which has currently been input is valid data. This data validity signal is a signal indicating whether or not each the pixel data included in the unit line is valid pixel data. Then, the control section 334 generates the buffer control signal of a timing at which only valid input data (pixel data) is written to the input buffer 331. Thereby, when the pixel data temporarily stored in the input buffer 331 is read by the control section 334, the arithmetic section 333 can perform an arithmetic operation of image processing according to the mode selection signal to the valid pixel data temporarily stored in the input buffer 331.

Also, in accordance with the data request signal input from the processing module of the subsequent stage, the control section 334 outputs a data acknowledge signal indicating that the arithmetic section 333 outputs the output data (the processed pixel data) generated by performing an arithmetic operation of image processing, to the processing module of the subsequent stage. At this time, the control section 334 generates a buffer control signal for performing control for reading the input data (pixel data) temporarily stored in the input buffer 331 and outputs the generated buffer control signal to the input buffer 331. Thereby, valid input data (pixel data) temporarily stored in the input buffer 331 is input to the arithmetic section 333 via the selector 332. Then, the arithmetic section 333 performs an arithmetic operation of image processing according to the mode selection signal to the input valid pixel data, and outputs the processed pixel data after performing the arithmetic operation of image processing as output data to the processing module of the subsequent stage. Also, a data validity signal indicating whether or not the output data (the processed pixel data) included in the unit line, generated by performing the arithmetic operation of image processing in the arithmetic section 333 is valid processed pixel data, is generated when the arithmetic section 333 performs the arithmetic operation of image processing, and is output together with the processed pixel data. However, the data validity signal may be generated and output by the control section 334 on the basis of a delay time (hereinafter referred to as "latency") from the input of the pixel data to the arithmetic section 333 to the output of the processed pixel data.

On the other hand, when there is no free storage capacity in the input buffer 331, the input buffer 331 cannot temporarily store the input data (pixel data) input to the image processing module 33. In this case, the control section 334 outputs a signal indicating that an output of input data (pixel data) is not requested as a state notification signal indicating that it is not possible to receive input data from the processing module of the previous stage, to the processing module of the previous stage. At this time, the state notification signal may indicate that the output of input data (pixel data) is not requested to the processing module of the previous stage by a logic level of the data request signal for requesting the output of input data (pixel data) or may indicate that the output of input data (pixel data) is not requested to the processing module of the previous stage, for example, by a signal, such as a pipeline stall signal indicating that the pipeline processing is (temporarily) stopped, different from the data request signal. Then, the control section 334 generates the buffer control signal for performing control for holding the pixel data temporarily stored in the input buffer 331 and outputs the generated buffer control signal to the input buffer 331.

If the parameter of the selector 332 set in the setting register 3341 by the CPU 50 indicates that the input data (pixel data) input to the image processing module 33 is not to be temporarily stored, the control section 334 outputs a through selection signal for selecting a path to be directly output to the arithmetic section 333 to the selector 332 without temporarily storing the input data (pixel data) input from the processing module of the previous stage in the input buffer 331. That is, the control section 334 outputs the through selection signal for selecting the path along which the input data (pixel data) input from the processing module of the previous stage bypasses the input buffer 331 and is transferred to the arithmetic section 333 to the selector 332. Thereby, the selector 332 transfers input data (pixel data) currently being input to the arithmetic section 333 as it is. At this time, on the basis of the data validity signal input together with the input data (pixel data) from the processing module of the previous stage, the control section 334 determines whether or not the input data (pixel data) which has been currently input is valid data and notifies the arithmetic section 333 of a timing of the input data (pixel data) indicated to be valid by that the data validity signal. To provide the notification of the liming of the valid input data (pixel data), the control section 334 may output the input data validity signal to the arithmetic section 333. Thereby, the arithmetic section 333 performs an arithmetic operation of image processing according to the mode selection signal to the directly input valid pixel data, and outputs the processed pixel data after performing the arithmetic operation of image processing as output data to the processing module of the subsequent stage. Also, the control section 334 outputs a data acknowledge signal according to the data request signal input from the processing module of the subsequent stage, to the processing module of the subsequent stage. Also, contents of the data validity signal indicating whether or not the output data (the processed pixel data) on which the arithmetic section 333 has performed the arithmetic operation of image processing is valid processed pixel data are similar to those when a parameter of the selector 332 set in the setting register 3341 by the CPU 50 indicates that input data (pixel data) input to the image processing module 33 is temporarily stored.

With such a configuration, the image processing module 33 of the first configuration provided in the image processing section 30, according to control from the CPU 50, performs the reception of input data (pixel data) from the processing module of the previous stage, the selection (switching) of pixel data on which performs the arithmetic operation or image processing, and the arithmetic operation of image processing by the arithmetic section 333.

(Second Configuration)

Next, the second configuration of each processing module provided in the image processing section 30 will be described. As described above, in the image processing module 33 provided in the image processing section 30, there is the image processing module 33 for exclusively performing a plurality of pieces of image processing by using a processing function which is the same as a coordinate conversion function or the like as well as the image processing module 33 of a configuration having one predetermined image processing function. The image processing module 33 of the second configuration is the image processing module 33 having a configuration, including a plurality of image processing arithmetic functions, for exclusively performing various image interpolation processes using a coordinate conversion function. In the following description, the image processing module 33 of the second configuration is referred to as an "image processing module 43".

Figure 4:
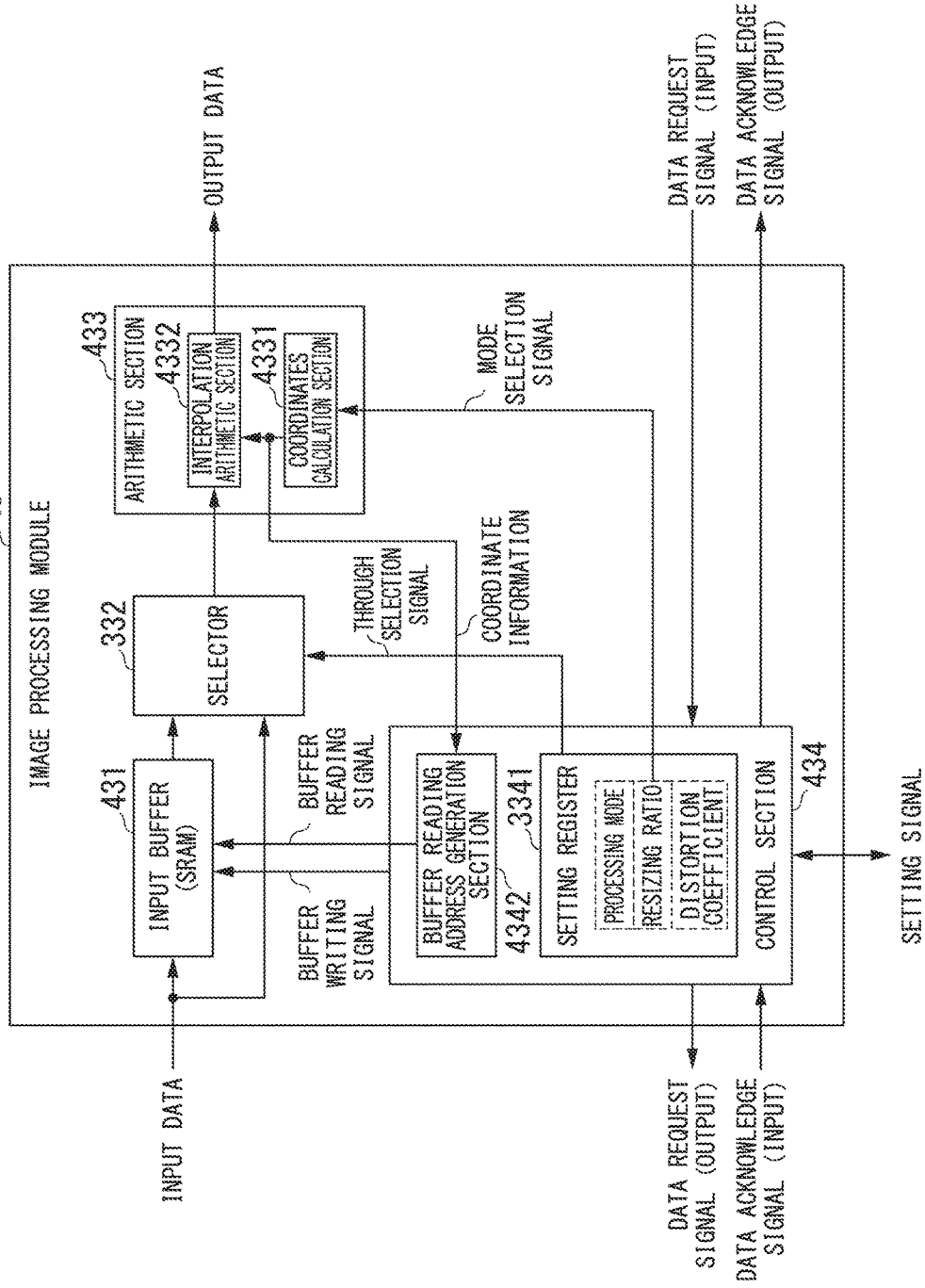
FIG. 4 is a block diagram showing a schematic configuration of the image processing module in the image processing section provided in the image processing device of the embodiment of the present invention.

FIG. 4 is a block diagram showing a schematic configuration of the image processing module 43 in the image processing section 30 provided in the image processing device 1 of the embodiment of the present invention. In FIG. 4, a basic configuration of the image processing module 43 of the second configuration is shown. The image processing module 43 of the second configuration shown in FIG. 4 includes an input buffer 431, the selector 332, an arithmetic section 433, and a control section 434. Also, the arithmetic section 433 includes a coordinates calculation section 4331 and an interpolation arithmetic section 4332. Also, the control section 434 includes the setting register 3341 and a buffer reading address generation section 4342.

The image processing module 43 is different from the image processing module 33 of the first configuration in that a plurality of image processing arithmetic functions are provided, but the image processing module 43 is also a component element for performing pipeline processing in the image processing section 30 as in the image processing module 33 of the first configuration. Thus, the component elements of the image processing module 43 of the second configuration include the component elements similar to those provided in the image processing module 33 of the first configuration shown in FIG. 3. Accordingly, in the following description, in the component elements of the image processing module 43, the same reference signs are assigned to component elements similar to those of the image processing module 33 of the first configuration, and only differences between the component elements will be described.

Similar to the input buffer 331 provided in the image processing module 33 of the first configuration, the input buffer 431 is a data buffer having a storage capacity capable of storing input data (pixel data) for a predetermined number of unit lines input from the processing module of the previous stage and temporarily stores input data which has been input in accordance with a buffer control signal (a buffer writing signal) input from the control section 434. Also, similar to the input buffer 331 provided in the image processing module 33 of the first configuration, the input buffer 431 reads pixel data temporarily stored in accordance with a buffer control signal (a buffer reading signal) input from the control section 434 and outputs the read pixel data to the selector 332.

Also in the image processing module 43, as in the input buffer 331 provided in the image processing module 33 of the first configuration, the number of unit lines (the storage capacity of the input buffer 431) temporarily stored in the input buffer 431 is predetermined. However, the image processing module 43 exclusively performs various image interpolation processes according to arithmetic functions of a plurality of pieces of image processing. Thus, in the image processing module 43, the number of necessary unit lines, that is, the storage capacity of the input buffer 431, differs according to each image processing (each image interpolation process) to be executed by the image processing module 43. Also, even when a case in which the image processing module 43 executes the same image processing, the number of necessary unit lines (the storage capacity of the input buffer 431) differs according to setting values (parameters) of the image processing (the image interpolation process).

Thus, in the image processing module 43, in order to be able to store the pixel data of the number of unit lines used in each image processing (image interpolation process) to be executed by the image processing module 43, the storage capacity corresponding to the maximum number of necessary unit lines is predetermined as the storage capacity of the input buffer 431.

Figure 5:
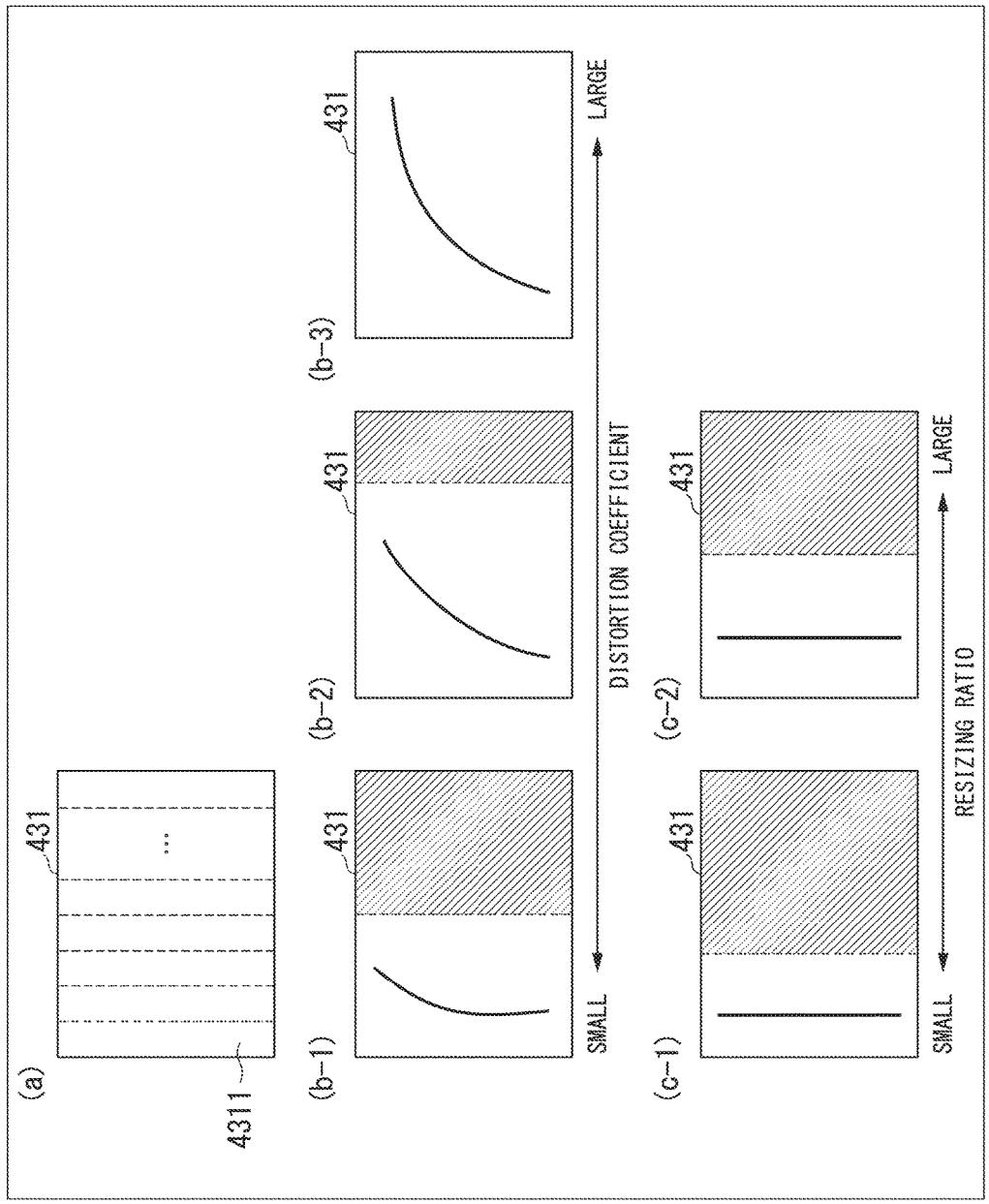
FIG. 5 is a diagram showing an example of an input buffer provided in the image processing module in the image processing section provided in the image processing device of the embodiment of the present invention.

Here, an example of the number of unit lines temporarily stored in the input buffer 431, that is, an example of the storage capacity of the input buffer 431, will be described. FIG. 5 is a diagram showing an example of the input buffer 431 provided in the image processing module 43 in the image processing section 30 provided in the image processing device 1 of the embodiment of the present invention. In FIG. 5, an example of the input buffer 431 provided in the image processing module 43 of a configuration in which the image interpolation process such as a resizing process, a distortion correction process, or a shape correction process can be performed using the coordinate conversion function is schematically shown.

As described above, the input buffer 431 has a storage capacity capable of storing pixel data for a predetermined number of unit lines. In (a) of FIG. 5, the input buffer 431 having a configuration in which a plurality of unit line storage regions 4311, each of which corresponds to one unit line for temporarily storing a plurality of pieces of pixel data consecutive in a column direction, are arranged in a row direction is shown. The configuration of the input buffer 431 shown in (a) of FIG. 5 is similar to that of the input buffer 331 provided in the image processing module 33 of the first configuration.

As described above, the storage capacity of the input buffer 431 is determined to be a storage capacity corresponding to the maximum number of unit lines required for each piece of image processing to be executed by the image processing module 43 of a configuration having arithmetic functions of a plurality of pieces of image processing. However, in the image processing module 43, the number of necessary unit lines differs according to the image processing to be executed. In (b-1) of FIG. 5 to (b-3) of FIG. 5, (c-1) of FIG. 5, and (c-2) of FIG. 5, an example of the number of necessary unit lines in image processing to be executed by the image processing module 43 is schematically shown.

For example, if the image processing module 43 performs the distortion correction process of the distortion aberration, the number of unit lines of the pixel data necessary for outputting the processed pixel data for one unit line after the distortion correction process is performed is determined according to a value (parameter) of the distortion coefficient set in the setting register 3341 by the CPU 50 on the basis of characteristics of the distortion aberration of the lens provided in the imaging device. If the image processing module 43 performs the distortion correction process of the distortion aberration, pixel data for one unit line on which the distortion correction process of the distortion aberration has been performed is generated by using the pixel data temporarily stored in the input buffer 431 on the basis of the value of the distortion coefficient. Thus, if the image processing module 43 performs the distortion correction process of the distortion aberration, as shown in (b-1) of FIG. 5 to (b-3) of FIG. 5, the unit line storage region 4311 for storing pixel data of a predetermined number of unit lines according to the value of the distortion coefficient within the number of unit lines capable of being temporarily stored by the input buffer 431 provided in the image processing module 43 is used. In (b-1) of FIG. 5 to (b-3) of FIG. 5, an example of a position within the input buffer 431 of the pixel data read from the input buffer 431 when the image processing module 43 generates the processed pixel data for one unit line by performing the distortion correction process of the distortion aberration is schematically shown.

If the value of the distortion coefficient is small, that is, if the distortion of the lens is little, the image processing module 43 can generate the processed pixel data for one unit line on which the distortion correction process of the distortion aberration has been performed using pixel data of a position shown in (b-1) of FIG. 5. That is, if the distortion of the lens is little, the image processing module 43 can perform the distortion correction process of the distortion aberration on input data (pixel data) which has been input by using pixel data with a small number of unit lines. However, in the distortion correction process of the distortion aberration, as the value of the distortion coefficient increases, that is, as the lens distortion increases, the number of unit lines used for the distortion correction process of the distortion aberration increases. That is, as shown in (b-2) of FIG. 5 and (b-3) of FIG. 5, because the range of the position of the pixel data used for the distortion correction process of the distortion aberration expands as the value of the distortion coefficient increases, the number of necessary unit lines increases.

Also, for example, if the image processing module 43 performs the resizing process, the number of unit lines of the pixel data necessary for outputting the processed pixel data for one unit line after the resizing process is performed is determined according to the value (parameter) of the resizing ratio set in the setting register 3341 by the CPU 50. If the image processing module 43 performs the resizing process, the processed pixel data for one unit line on which the resizing process has been performed is generated by using the pixel data temporarily stored in the input buffer 431 per interval based on the parameter of the resizing ratio. Thus, if the image processing module 43 performs the resizing process, as shown in (c-1) of FIG. 5 and (c-2) of FIG. 5, the unit line storage region 4311 for storing pixel data of a predetermined number of unit lines according to the resizing ratio within the number of unit lines capable of being temporarily stored by the input buffer 431 provided in the image processing module 43 is only used. In (c-1) of FIG. 5 and (c-2) of FIG. 5, an example of a position within the input buffer 431 of the pixel data read from the input buffer 431 when the image processing module 43 generates the processed pixel data for one unit line by performing the resizing process is schematically shown.

For example, when the value of the resizing ratio is small, that is, when the reduction ratio of the image is small, if the image is reduced, the image processing module 43 can generate the processed pixel data for one unit line after the resizing process is performed on the input data (pixel data) which has been input by reading pixel data of a predetermined position within a range of the small number of unit lines and performing the resizing process thereon as shown in (c-1) of FIG. 5. On the other hand, if the value of the resizing ratio is large, that is, if the reduction ratio of the image is large, the range of the number of unit lines used for the resizing process increases. That is, as shown in (c-2) of FIG. 5, the image processing module 43 generates the processed pixel data for one unit line after the resizing process is performed by reading pixel data of a predetermined position within the range of a greater number of unit lines.

As described above, because the number of unit lines required for each piece of image processing to be executed is different in the image processing module 43 having arithmetic functions of a plurality of pieces of image processing, a storage capacity capable of storing pixel data for a maximum number of unit lines required for each piece of image processing is predetermined as the storage capacity of the input buffer 431.

Also, if the image processing module 43 performs a distortion correction process of magnification chromatic aberration, if a shape correction process such as trapezoidal correction is performed, if another filtering process is performed, or the like, a method of determining the storage capacity of the input buffer 431 can be considered to be similar to an example shown in FIG. 5.

Also, similar to the input buffer 331 provided in the image processing module 33 of the first configuration, the input buffer 431 may also be constituted of a double buffer.

The selector 332 selects either pixel data read from the input buffer 431 or intact input data (pixel data) currently input from the processing module of the previous stage in accordance with a through selection signal input from the control section 434 and transfers the selected pixel data to the arithmetic section 433.

The arithmetic section 433 performs an arithmetic operation of image processing (an image interpolation process) according to the mode selection signal input from the control section 434 (an arithmetic operation of an image interpolation process such as a resizing process, a distortion correction process, a shape correction process, or the like) on the input pixel data. In the arithmetic section 433, the arithmetic section 433 itself determines a position (coordinates) of the pixel data used when the arithmetic operation of image processing is performed. Then, the arithmetic section 433 performs an arithmetic operation of image processing on the basis of the pixel data positioned at the determined coordinates.

More specifically, the coordinates calculation section 4331 calculates coordinates of pixel data used when an interpolation arithmetic operation for interpolating pixel data is performed on the basis of the mode selection signal input from the control section 434, that is, the setting values of the image processing (the image interpolation process) set in the setting register 3341 by the CPU 50 (a parameter of the resizing ratio, a parameter of the distortion coefficient, or the like). Then, the coordinates calculation section 4331 outputs information of the calculated coordinates (hereinafter referred to as "coordinate information") to each of the interpolation arithmetic section 4332 and the control section 434.

The interpolation arithmetic section 4332 performs an interpolation arithmetic operation (for example, a bilinear interpolation or a bicubic interpolation) on the basis of the coordinate information output from the coordinates calculation section 4331 and the pixel data read from the input buffer 431 on the basis of the coordinate information and input via the selector 332. The arithmetic section 433 outputs the processed pixel data generated by performing an interpolation arithmetic operation as output data to the processing module of the subsequent stage via the connection switching section 31.

Similar to the control section 334 provided in the image processing module 33 of the first configuration, the control section 434 controls delivery of input data (pixel data) and output data (the processed pixel data) between processing modules connected to the stage previous to and the stage subsequent to the image processing module 43. At this time, the state notification signal output by the control section 434 to the processing modules of the previous stage and the subsequent stage is similar to the state notification signal output by the control section 334 provided in the image processing module 33 of the first configuration.

Also, similar to the control section 334 provided in the image processing module 33 of the first configuration, the control section 434 controls an operation of each component element in the image processing module 43 including the control section 434 itself on the basis of the setting stored in the setting register 3341 according to the setting signal input from the CPU 50. In the image processing module 43, a parameter of the selector 332, a processing mode (a resizing processing mode, a distortion correction processing mode, or a shape correction processing mode) when the interpolation arithmetic operation is performed by the arithmetic section 433, and the setting values (such as a parameter of the resizing ratio or the distortion coefficient) of image processing (image interpolation processing), are stored (set) in the setting register 3341 by the CPU 50. Also, the through selection signal or the mode selection signal output to the selector 332 or the arithmetic section 433 in accordance with the parameters or the processing mode set in the setting register 3341 is similar to each signal output by the control section 334 provided in the image processing module 33 of the first configuration.

Also, the control section 434 also reads pixel data temporarily stored in the input buffer 431 on the basis of the coordinate information input from the arithmetic section 433 and transfers the read pixel data to the arithmetic section 433 via the selector 332.

More specifically, the buffer reading address generation section 4342 generates an address (hereinafter referred to as a "buffer reading address") for designating a storage region of the input buffer 431 temporarily storing pixel data corresponding to coordinates of the pixel data used when the interpolation arithmetic operation is performed indicated by the coordinate information input from the arithmetic section 433. Then, the control section 434 outputs a buffer control signal (buffer reading signal) including the buffer reading address generated by the buffer reading address generation section 4342 to the input buffer 431. Thereby, the pixel data positioned at the coordinates calculated by the coordinates calculation section 4331 provided in the arithmetic section 433 is read from the input buffer 431 and transferred to the arithmetic section 433 via the selector 332. The control of the operation of the input buffer 431 in the control section 434 is similar to that of the control section 334 provided in the image processing module 33 of the first configuration, except that the pixel data indicated by the coordinate information input from the arithmetic section 433 is read from the input buffer 431 and transferred.

With such a configuration, the image processing module 33 (the image processing module 43) of the second configuration provided in the image processing section 30, as in the image processing module 33 of the first configuration, according to control from the CPU 50, performs the reception of input data (pixel data) from the processing module of the previous stage, the selection (switching) of pixel data on which performs the arithmetic operation of image processing, and the arithmetic operation of image processing by the arithmetic section 333.

In the image processing section 30, each processing module connected to the pipeline performs a series of image processing on each block image data, that is, pipeline processing, by sequentially performing an arithmetic operation of image processing on pixel data for each unit line included in each the block image data.

In the image processing device 1, a pipeline configuration of each processing module provided in the image processing section 30 and image processing to be performed on data of a still image of one frame by the image processing section 30 according to the pipeline processing can be set by the CPU 50, if necessary. In other words, in the image processing device 1, the connection switching section 31 provided in the image processing section 30 can implement various pipeline configurations by switching a connection of each processing module provided in the image processing section 30. Also, in the image processing device 1, parameters such as the processing mode and the filter coefficient of the arithmetic section 333 set in the setting register 3341 within the control section 334 provided in the image processing module 33 and parameters such as the processing mode and the distortion coefficient of the arithmetic section 433 set in the setting register 3341 within the control section 434 provided in the image processing module 43 can be set for each image processing to be executed in the image processing section 30. Also, in the image processing device 1, a parameter of a path for transferring input data to the arithmetic section 333 provided in the image processing module 33 and a parameter of a path for transferring input data to the arithmetic section 433 provided in the image processing module 43 can be set for each image processing to be executed in the image processing section 30. For example, if a lens with large distortion aberration is attached to the imaging device, the pipeline configuration within the image processing section 30 is configured to perform the distortion correction process of the distortion aberration, and it is possible to set a parameter of the distortion coefficient in the image processing module 43 for performing the distortion correction process of the distortion aberration to a value corresponding to the characteristics of the distortion aberration of the attached lens.

Figure 6:
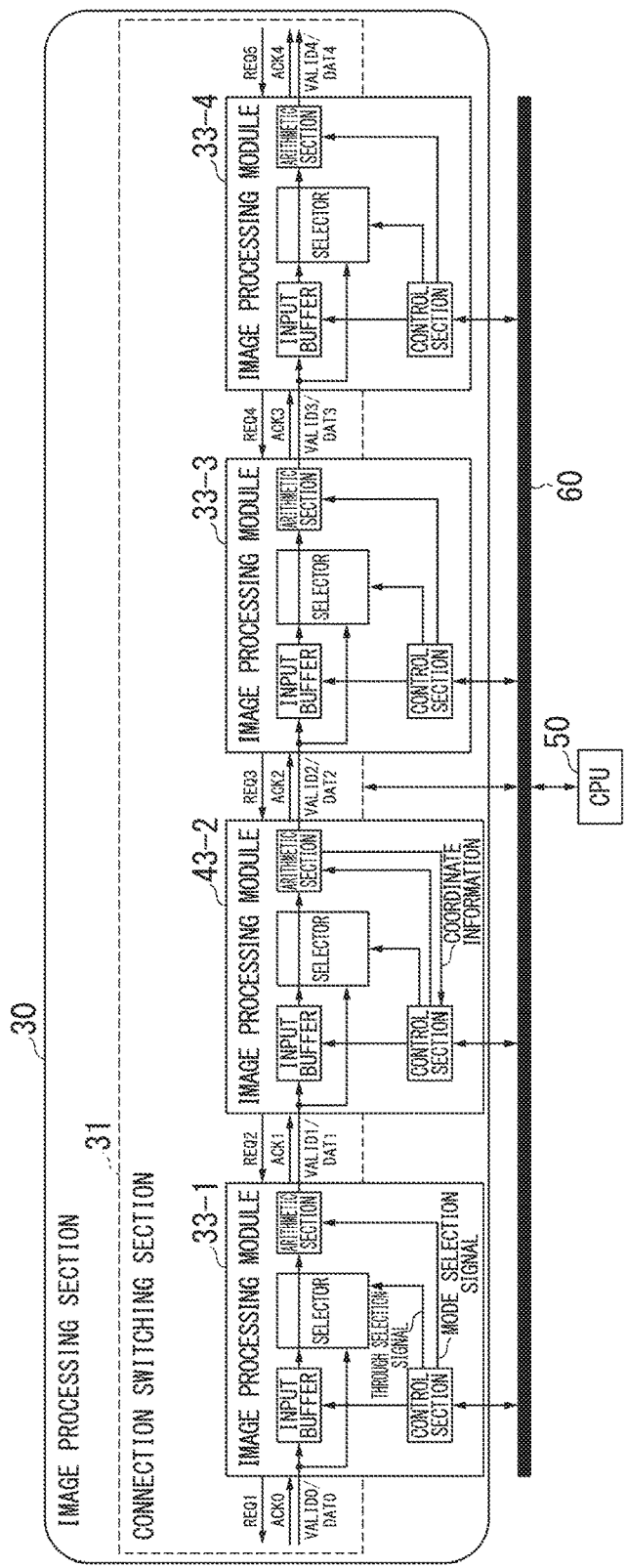
FIG. 6 is a diagram showing an example of a connection of the image processing modules in the image processing section provided in the image processing device of the embodiment of the present invention.

Next, the operation of each processing module provided in the image processing section 30 will be described. FIG. 6 is a diagram showing an example of a connection of image processing modules (the image processing module 33 and the image processing module 43) in the image processing section 30 provided in the image processing device 1 of the embodiment of the present invention. In FIG. 6, a configuration in which a series of pipeline processing is performed according to a pipeline configuration in which the image processing module 33-1, the image processing module 43-2, the image processing module 33-3, and the image processing module 33-4 are connected in series is shown. In FIG. 6, illustration of the input DMA module 32 and the output DMA module 34 provided in the image processing section 30 is omitted.

As described above, the image processing module 33 has functions of image processing such as YC processing, a noise reduction process, LPF processing, edge enhancement processing, and the like, and the image processing module 43 performs arithmetic functions of a plurality of pieces of image processing such as a resizing process, a distortion correction process, and a shape correction process. An example of the pipeline configuration shown in FIG. 6 is, for example, a pipeline configuration in which the image processing module 33-1 performs YC processing, the image processing module 43-2 performs the distortion correction process of distortion aberration, the image processing module 33-3 performs a noise reduction process, and the image processing module 33-4 performs an edge enhancement process.

In the image processing section 30, as described above, the connection switching section 31 switches a connection of each processing module within the image processing section 30 in accordance with control from the CPU 50. In FIG. 6, a data request signal REQ, a data acknowledge signal ACK, input data DAT, output data DAT, and a data validity signal VALID are shown as input signal and output signal for switching a connection to enable the connection switching section 31 to perform delivery of pixel data and the processed pixel data between each the processing modules. In FIG. 6, each of the input signals and output signals within the connection switching section 31 is indicated by adding a numeral portion, which is subsequent to "-" given to the processing module of a side which outputs the signal, to a reference numeral thereof. For example, the data request signal REQ output from the image processing module 43-2 and input to the image processing module 33-1 is shown as a "data request signal REQ2".

More specifically, in the example of the pipeline configuration of FIG. 6, the connection switching section 31 connects output terminals of the data acknowledge signal ACK, the data validity signal VALID, and the input data DAT of the processing module (for example, the input DMA module 32) of the stage previous to the image processing module 33-1 and input terminals of the data acknowledge signal ACK, the data validity signal VALID, and the input data DAT of the image processing module 33-1. Also, the connection switching section 31 connects an output terminal of the data request signal REQ of the image processing module 33-1 and an input terminal of the data request signal REQ of the processing module (for example, the input DMA module 32) of the stage previous to the image processing module 33-1. Thereby, a data acknowledge signal ACK0, a data validity signal VALID0, and a input data DAT0, which are output signals of the processing module (for example, the input DMA module 32) of the stage previous to the image processing module 33-1, are input to the image processing module 33-1, and a data request signal REQ1, which is an output signal of the image processing module 33-1, is input to the processing module (for example, the input DMA module 32) of the previous stage.

Also, likewise, the connection switching section 31 connects output terminals of the data acknowledge signal ACK, the data validity signal VALID, and the input data DAT of the image processing module 33-1 in the stage previous to the image processing module 43-2 and input terminals of the data acknowledge signal ACK, the data validity signal VALID, and the input data DAT of the image processing module 43-2. Also, the connection switching section 31 connects an output terminal of the data request signal REQ of the image processing module 43-2 and an input terminal of the data request signal REQ of the image processing module 33-1 of the stage previous to the image processing module 43-2. Thereby, a data acknowledge signal ACK1, a data validity signal VALID1, and a processed pixel data DAT1, which are output signals of the image processing module 33-1 in the stage previous to the image processing module 43-2, are input to the image processing module 43-2, and a data request signal REQ2, which is an output signal of the image processing module 43-2, is input to the image processing module 33-1 of the previous stage.

Likewise, the connection switching section 31 connects output terminals of the data acknowledge signal ACK, the data validity signal VALID, and the input data DAT of the image processing module 43-2 in the stage previous to the image processing module 33-3 and input terminals of the data acknowledge signal ACK, the data validity signal VALID, and the input data DAT of the image processing module 33-3. Also, the connection switching section 31 connects an output terminal of the data request signal REQ of the image processing module 33-3 and an input terminal of the data request signal REQ of the image processing module 43-2 in the stage previous to the image processing module 33-3. Thereby, a data acknowledge signal ACK2, a data validity signal VALID2, and a processed pixel data DAT2, which are output signals of the image processing module 43-2 in the stage previous to the image processing module 33-3, are input to the image processing module 33-3, and a data request signal REQ3, which is an output signal of the image processing module 33-3, is input to the image processing module 43-2 of the previous stage.

Likewise, the connection switching section 31 connects output terminals of the data acknowledge signal ACK, the data validity signal VALID, and the input data DAT of the image processing module 33-3 in the stage previous to the image processing module 33-4, and input terminals of the data acknowledge signal ACK, the data validity signal VALID, and the input data DAT of the image processing module 33-4. Also, the connection switching section 31 connects an output terminal of the data request signal REQ of the image processing module 33-4 and an input terminal of the data request signal REQ of the image processing module 33-3 in the stage previous to the image processing module 33-4. Thereby, a data acknowledge signal ACK3, a data validity signal VALID3, and a processed pixel data DAT3, which are output signals of the image processing module 33-3 in the stage previous to the image processing module 33-4, are input to the image processing module 33-4, and a data request signal REQ4, which is an output signal of the image processing section 33-4, is input to the image processing module 33-3 of the previous stage.

Likewise, the connection switching section 31 connects input terminals of the data acknowledge signal ACK, the data validity signal VALID, and the input data DAT of the processing module (for example, the output DMA module 34) in the stage subsequent to the image processing module 33-4 and output terminals of the data acknowledge signal ACK, the data validity signal VALID, and the input data DAT of the image processing module 33-4. Also, the connection switching section 31 connects an input terminal of the data request signal REQ of the image processing module 33-4 and an output terminal of the data request signal REQ of the processing module (for example, the output DMA module 34) in the stage subsequent to the image processing module 33-4. Thereby, a data acknowledge signal ACK4, a data validity signal VALID4, and a processed pixel data DAT4, which are output signals of the image processing module 33-4, are input to the processing module (for example, the output DMA module 34) in the stage subsequent to the image processing module 33-4, and a data request signal REQ5, which is an output signal of the processing module (for example, the output DMA module 34) in the stage subsequent to the image processing module 33-4, is input to the image processing module 33-4.

Also, in the example of the pipeline configuration in FIG. 6, the CPU 50 sets a parameter of the selector 332 indicating that the input data DAT which has been input is temporarily stored, in the setting register 3341 provided in the control section 334 of each image processing module 33 and the setting register 3341 provided in the control section 434 of the image processing module 43. Thereby, the control section 334 of each image processing module 33 outputs a through selection signal for selecting a path for outputting the input data DAT temporarily stored in the input buffer 331 to the arithmetic section 333 to the selector 332, and the selector 332 transfers the input data DAT read by the control section 334 to the arithmetic section 333. Also, the control section 434 of the image processing module 43 outputs a through selection signal for selecting a path for outputting the input data DAT temporarily stored in the input buffer 431 to the arithmetic section 433 to the selector 332, and the selector 332 transfers the input data DAT read by the control section 434 to the arithmetic section 433.

More specifically, in the image processing module 33-1, selects a path for temporarily storing the input data DAT0 which has been input in the input buffer 331 and transferring the read input data DAT0 to the arithmetic section 333 according to the through selection signal output from the control section 334. Also, in the image processing module 43-2, according to the through selection signal output from the control section 434, the input processed pixel data DAT1 is temporarily stored in the input buffer 431 and a path for transferring the read processed pixel data DAT1 to the arithmetic section 433 is selected. Also, in the image processing module 33-3, according to the through selection signal output from the control section 334, the input processed pixel data DAT2 is temporarily stored in the input buffer 331 and a path for transferring the read processed pixel data DAT2 to the arithmetic section 333 is selected. Also, in the image processing module 33-4, according to the through selection signal output from the control section 334, the input processed pixel data DAT3 is temporarily stored in the input buffer 331 and a path for transferring the read processed pixel data DAT3 to the arithmetic section 333 is selected.

As shown in FIG. 6, by constructing a pipeline configuration in which each the processing modules are connected, the image processing section 30 performs a series of image processing (pipeline processing) in which YC processing, a distortion correction process of distortion aberration, a noise reduction process, and an edge enhancement process on each the block image data. In this pipeline processing, each processing module provided in the image processing section 30 reads after being temporarily stored the input data DAT or the processed pixel data DAT in the input buffer 331 or the input buffer 431 and sequentially outputs the read data to the processing module of the subsequent stage.

Figure 7:
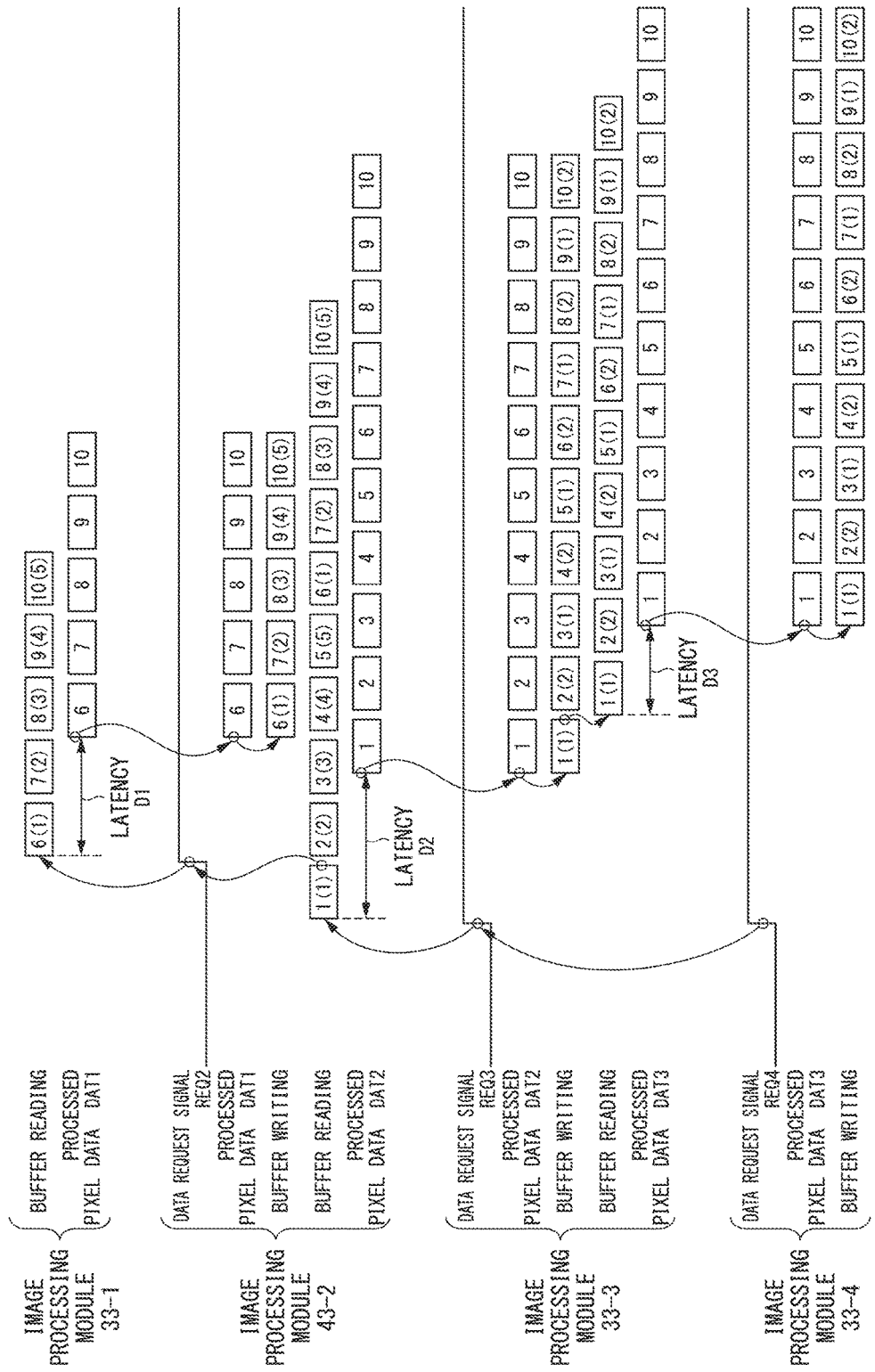
FIG. 7 is a timing chart showing an example of an operation of the image processing module in the image processing section provided in the image processing device of the embodiment of the present invention.

FIG. 7 is a timing chart showing an example of an operation of the image processing modules (the image processing module 33 and the image processing module 43) in the image processing section 30 provided in the image processing device 1 of the embodiment of the present invention. In FIG. 7, an example of delivery of the processed pixel data from the image processing module 33-1 to the image processing module 33-4 when the image processing section 30 performs a series of pipeline processing with the pipeline configuration shown in FIG. 6 is shown.

In FIG. 7, one or both of input data and output data (the processed pixel data DAT) in each processing module and the data request signal REQ output by each processing module to the processing module of the previous stage are shown. Also, in FIG. 7, in each processing module, one or both of a buffer control signal (a buffer writing signal) indicating writing of the processed pixel data DAT to the input buffer 331 or the input buffer 431 and a buffer control signal (a buffer reading signal) indicating reading of the processed pixel data DAT from the input buffer 331 or the input buffer 431 are shown.

In the following description, for easy description, timings of the data acknowledge signal ACK and the data validity signal VALID are assumed to be the same as that of the output data (the processed pixel data DAT), that is, all output data (the processed pixel data DAT) output from each processing module is assumed to be valid processed pixel data. Accordingly, in FIG. 7, illustration of the data acknowledge signal ACK and the data validity signal VALID in each processing module is omitted.

Also, in the description of FIG. 7, it is assumed that image processing is performed using one unit line as one unit of processing. In FIG. 7, numbers indicating the number of a unit line is shown with respect to each of the input data (the processed pixel data DAT), a period during which the buffer writing signal is output, a period during which the buffer reading signal is output, and the output data (the processed pixel data DAT).

Also, it is assumed that the image processing module 33-1 includes the input buffer 331 having a storage capacity capable of storing the processed pixel data DAT0 for five unit lines and the image processing module 43-2 includes the input buffer 431 having a storage capacity capable of storing the processed pixel data DAT1 for five unit lines. Also, it is assumed that each of the image processing module 33-3 and the image processing module 33-4 includes the input buffer 331 having a storage capacity capable of storing the processed pixel data DAT for two unit lines. That is, it is assumed that the input buffer 331 provided in the image processing module 33-1 includes five unit line storage regions (hereinafter referred to as a "unit line storage region 3311"), the input buffer 431 provided in the image processing module 43-2 includes five unit line storage regions 4311, and the input buffer 331 provided in each of the image processing module 33-3 and the image processing module 33-4 includes two unit line storage regions 3311. In FIG. 7, to indicate which unit line storage region in the data buffer provided for each processing module temporarily stores the processed pixel data DAT, a number indicating a unit line storage region is shown within "( ): parentheses" subsequent to the number indicating the number of the unit line shown in each of periods during which the buffer writing signal and the buffer reading signal are output.

In the following description, in order to distinguish between component elements provided in each of the image processing modules, the component element is indicated by adding "-" given to each of the image processing module and a numeral portion subsequent to "-" subsequently to a reference numeral assigned to each component element. For example, the input buffer 331 provided in the image processing module 33-1 is represented as an "input buffer 331-1", and the input buffer 431 provided in the image processing module 43-2 is represented as an "input buffer 431-2".

Also, in the description of FIG. 7, an operation from a state in which the processed pixel data DAT1 for the five unit lines output from the image processing module 33-1 is already temporarily stored in the input buffer 431-2 provided in the image processing module 43-2 and input data (pixel data) for five unit lines to be processed the next time is already temporarily stored in the input buffer 331-1 provided in the image processing module 33-1 after the image processing section 30 starts pipeline processing will be described That is, an operation from a state in which the processed pixel data DAT1 of first to fifth unit lines is already temporarily stored in the first to fifth unit line storage regions 4311-2 of the input buffer 431-2 provided in the image processing module 43-2 and the processed pixel data DAT0 of sixth to tenth unit lines is already temporarily stored in the first to fifth unit line storage regions 3311-1 of the input buffer 331-1 provided in the image processing module 33-1 will be described.

During the above-described state, when the control section 334-4 provided in the image processing module 33-4 outputs the data request signal REQ4 for requesting the output of the processed pixel data DAT3 to the image processing module 33-3, the control section 334-3 provided in the image processing module 33-3 outputs the data acknowledge signal ACK3 in accordance with the data request signal REQ4 input from the image processing module 33-4 of the subsequent stage. Then, the control section 334-3 outputs the data request signal REQ3 for requesting the output of the processed pixel data DAT2 to the image processing module 43-2.

In FIG. 7, a period during which the data request signal REQ has a "High" level represents a request period during which each processing module is in a state in which it is possible to receive the processed pixel data DAT and a period during which the data request signal REQ has a "Low" level represents a request negate period during which each processing module is in a state in which it is not possible to receive the processed pixel data DAT.

The control section 434-2 provided in the image processing module 43-2 outputs the data acknowledge signal ACK2 in accordance with the data request signal REQ3 input from the image processing module 33-3 of the subsequent stage. Then, the control section 434-2 generates a buffer reading signal for reading the processed pixel data DAT1 of the first unit line temporarily stored in the input buffer 431-2. Thereby, during the buffer reading period of the first unit line, the processed pixel data DAT1 read from five first unit line storage region 4311-2 of the input buffer 431-2 is transferred to the arithmetic section 433-2 via the selector 332-2. Then, the arithmetic section 433-2 outputs the processed pixel data DAT2 generated by performing an arithmetic operation of a distortion correction process of distortion aberration according to the mode selection signal output from the control section 434-2 on the processed pixel data DAT1 of the first unit line input via the selector 332-2 to the image processing module 33-3. Also, the processed pixel data DAT2 corresponding to the first unit line output from the image processing module 43-2 is output after being delayed by a delay time D2 (latency D2) until the processed pixel data DAT2 is output after the processed pixel data DAT1 is input, caused by performing an arithmetic operation of a distortion correction process of distortion aberration in the arithmetic section 433-2.

Also, when the reading of the processed pixel data DAT1 of the first unit line temporarily stored in the input buffer 431-2 is completed, subsequently, the control section 434-2 sequentially generates a buffer reading signal for reading the processed pixel data DAT1 of the second and subsequent unit lines from the input buffer 431-2. Thereby, during the buffer reading period of each unit line, the processed pixel data DAT1 sequentially read from each unit line storage region 4311-2 of the input buffer 431-2 is sequentially transferred to the arithmetic section 433-2 via the selector 332-2. Then, the arithmetic section 433-2 sequentially outputs the processed pixel data DAT2 of the second and subsequent unit lines generated by performing the arithmetic operation of the distortion correction process of the distortion aberration on the processed pixel data DAT1 of each of unit lines sequentially input via the selector 332-2 to the image processing module 33-3.

Also, when the control section 434-2 completes the reading of the processed pixel data DAT1 of the first unit line, the input buffer 431-2 becomes in a state in which the processed pixel data DAT1 is not stored in one unit line storage region 4311-2 (the first unit line storage region 4311-2) (the first unit line storage region 4311-2 is free). In other words, the image processing module 43-2 becomes in a state in which it is possible to receive the next processed pixel data DAT1 from the image processing module 33-1. Thus, in order to indicate that the image processing module 43-2 is in a state in which it is possible to receive the processed pixel data DAT1, the control section 434-2 sets the data request signal REQ2 to be output to the image processing module 33-1 to the "High" level. Thereby, in accordance with the data request signal REQ2, the image processing module 33-1 sequentially outputs the processed pixel data DAT1 corresponding to each unit line generated by performing an arithmetic operation of YC processing on the pixel data of each of the sixth and subsequent unit lines temporarily stored in the input buffer 331, to the image processing module 43-2 from a timing at which the processed pixel data DAT1 has been delayed by a delay time D1 (latency D1).

Also, when the reading of pixel data of the sixth unit line temporarily stored in the input buffer 331 is completed, the control section 334-1 provided in the image processing module 33-1 becomes in a state in which the first unit line storage region 3311-1 of the input buffer 331-1 is free and becomes in a state in which it is possible to receive the next input data (pixel data) from the processing module (for example, the input DMA module 32) of the previous stage. Thus, as in the image processing module 43-2, the control section 334-1 may indicate a state in which it is possible to receive input data (pixel data) by setting the data request signal REQ1 output to the processing module (for example, the input DMA module 32) of the previous stage to the "High" level. Thereby, the processing module (for example, the input DMA module 32) of the previous stage sequentially outputs the input data (pixel data) of the next unit line to the image processing module 33-1 in accordance with the data request signal REQ1.

When the processed pixel data DAT1 corresponding to the sixth and subsequent unit lines is input from the image processing module 33-1 of the previous stage, the control section 434-2 generates a buffer writing signal for writing the input processed pixel data DAT1 of each unit line to a free unit line storage region 4311-2 within the input buffer 431-2. Thereby, during the buffer writing period of each unit line, the processed pixel data DAT1 corresponding to the sixth and subsequent unit lines is sequentially temporarily stored in the input buffer 431-2. More specifically, the processed pixel data DAT1 corresponding to the sixth unit line is written to and temporarily stored in the first unit line storage region 4311-2 which becomes initially free. Subsequently, the processed pixel data DAT1 corresponding to the seventh unit line is written to and temporarily stored in the second unit line storage region 4311-2 which is free next. Thereafter, likewise, the processed pixel data DAT1 corresponding to each unit line is sequentially written to and temporarily stored in each unit line storage region 4311-2 within the input buffer 431-2 in the free state after reading by the control section 434-2.

In this manner, the image processing module 43-2 reads after being temporarily stored the processed pixel data DAT1 input from the image processing module 33-1 of the previous stage in the input buffer 431-2 and sequentially outputs the processed pixel data DAT2 generated by the distortion correction process of the distortion aberration to the image processing module 33-3 of the subsequent stage.

When the processed pixel data DAT2 corresponding to the first unit line is input from the image processing module 43-2 of the previous stage, the control section 334-3 provided in the image processing module 33-3 generates a buffer writing signal for writing the input processed pixel data DAT2 to the free unit line storage region 3311-3 within the input buffer 331-3. Also, in FIG. 7, in the first stage when the image processing section 30 starts the pipeline processing, the processed pixel data DAT2 is not temporarily stored in the input buffer 331-3, that is, the entire unit line storage region 3311-3 of the input buffer 331-3 is free. Thus, during the buffer writing period of the first unit line in the image processing module 33-3, the processed pixel data DAT2 corresponding to the first unit line input from the image processing module 43-2 is written to and temporarily stored in the first unit line storage region 3311-3 of the input buffer 331-3.

Also, the input buffer 331-3 includes two unit line storage regions 3311-3. That is, even when the processed pixel data DAT2 is written to the first unit line storage region 3311-3, the second unit line storage region 3311-3 is free. Thus, when the writing of the processed pixel data DAT2 of the first unit line to the input buffer 331-3 is completed, subsequently, the control section 334-3 sequentially generates the buffer writing signal for writing the processed pixel data DAT2 corresponding to the second unit line to the input buffer 331-3. Thereby, in the input buffer 331-3, during the buffer writing period of the second unit line in the image processing module 33-3, the processed pixel data DAT2 corresponding to the second unit line input from the image processing module 43-2 is written to and temporarily stored in the second unit line storage region 3311-3 of the input buffer 331-3.

Also, in the image processing module 33-3, the data request signal REQ4 for requesting the output of the processed pixel data DAT3 is input from the image processing module 33-4 of the subsequent stage. Thus, when the writing of the processed pixel data DAT2 corresponding to the first unit line to input buffer 331-3 is completed, the control section 334-3 generates a buffer reading signal for reading the processed pixel data DAT2 of the first unit line temporarily stored in the input buffer 331-3. Thereby, during the buffer reading period of the first unit line, the processed pixel data DAT2 read from the first unit line storage region 3311-3 of the input buffer 331-3 is transferred to the arithmetic section 333-3 via the selector 332-3. Then, the arithmetic section 333-3 outputs the processed pixel data DAT3 generated by performing an arithmetic operation of a noise reduction process on the processed pixel data DAT2 of the first unit line input via the selector 332-3 according to the mode selection signal output from the control section 334-3, to the image processing module 33-4 from a timing at which the processed pixel data DAT3 has been delayed by the delay time D3 (latency D3).

Also, if the writing of the processed pixel data DAT2 of the second unit line to the input buffer 331-3 is completed, the control section 334-3 reads the processed pixel data DAT2 of the second unit line subsequently after reading the processed pixel data DAT2 of the first unit line from the input buffer 331-3. Thereby, the arithmetic section 333-3 outputs the processed pixel data DAT3 generated by performing the arithmetic operation of the noise reduction process on the processed pixel data DAT2 of the second unit line to the image processing module 33-4.

Also, when the reading of the processed pixel data DAT2 of the first unit line is completed by the control section 334-3, the first unit line storage region 3311-3 of the input buffer 331-3 becomes free. Thus, subsequently after the writing of the processed pixel data DAT2 of each of the second unit lines to the input buffer 331-3, the control section 334-3 writes the processed pixel data DAT2 corresponding to the third unit line to the first unit line storage region 3311-3 of the input buffer 331-3 during the buffer writing period of the third unit line.

In this manner, in the image processing module 33-3, writing of the processed pixel data DAT2 to one unit line storage region 3311-3 and reading of the processed pixel data DAT2 from the other unit line storage region 3311-3 are alternately performed with respect to the two unit line storage regions 3311-3 within the input buffer 331-3. Thereby, in the image processing module 33-3, during the buffer writing period of each unit line the processed pixel data DAT2 sequentially input from the image processing module 43-2 of the previous stage is sequentially written, and during the buffer reading period of each unit line the processed pixel data DAT2 of each unit line temporarily stored in the input buffer 331-3 is sequentially read. Then, in the image processing module 33-3, the processed pixel data DAT3 generated by the arithmetic section 333-3 performing the arithmetic operation of the noise reduction process on the processed pixel data DAT2 sequentially read from the input buffer 331-3 is sequentially output to the image processing module 33-4.

In this manner, similar to the image processing module 43-2, the image processing module 33-3 reads after being temporarily stored the processed pixel data DAT2 sequentially input from the image processing module 43-2 of the previous stage in the input buffer 331-3 and sequentially outputs the processed pixel data DAT3 generated by performing the noise reduction process on the read processed pixel data DAT2 to the image processing module 33-4 of the subsequent stage.

Then, the image processing module 33-4 sequentially outputs the processed pixel data DAT4 generated by sequentially performing the edge enhancement process on the processed pixel data DAT3 sequentially input from the image processing module 33-3 of the previous stage to the processing module (for example, the output DMA module 34) of the subsequent stage. In the image processing section 30 having the pipeline configuration shown in FIG. 6 described in FIG. 7, the input buffer 331-4 provided in the image processing module 33-4 includes two unit line storage regions 3311-4. Thus, similar to the image processing module 33-3, the image processing module 33-4 alternately performs writing of the processed pixel data DAT3 to one unit line storage region 3311-4 within the input buffer 331-4 and reading of the processed pixel data DAT3 from the other unit line storage region 3311-4. Then, in the image processing module 33-4, the arithmetic section 333-4 performs an arithmetic operation of the edge enhancement process on the processed pixel data DAT3 sequentially read from the input buffer 331-4.

In this manner, in the image processing section 30, a delay of a process in the arithmetic section (the arithmetic section 333 or the arithmetic section 433) is absorbed by temporarily storing the input data (the pixel data or the processed pixel data) in the data buffer (the input buffer 331 or the input buffer 431) provided in each processing module constituting the pipeline and the pipeline processing is smoothly performed without a delay in a flow of the processed pixel data DAT between the processing modules. In other words, the image processing section 30 is configured so that a pipeline stall state in which the output of the processed pixel data DAT to the processing module of the subsequent stage is (temporarily) stopped or the request for the processed pixel data DAT to the processing module of the previous stage is (temporarily) stopped can be avoided.

Meanwhile, in an example of the operation of the image processing module 33 and the image processing module 43 in the image processing section 30 shown in FIG. 7, the image processing module 33-3 alternately performs the writing of the processed pixel data DAT2 to one unit line storage region 3311-3 within the input buffer 331-3 and the reading of the processed pixel data DAT2 from the other unit line storage region 3311-3. That is, in the image processing module 33-3, reads immediately after being temporarily stored the processed pixel data DAT2 sequentially input from the image processing module 43-2 of the previous stage in the input buffer 331-3 and the arithmetic section 333-3 performs the noise reduction process on the read processed pixel data DAT2. Thus, a configuration in which the arithmetic section 333-3 directly performs the arithmetic operation of the noise reduction process on the processed pixel data DAT2 currently input from the image processing module 43-2 without writing and reading the processed pixel data DAT2 to and from the input buffer 331-3 in the image processing module 33-3 may also be conceived. That is, a case in which the CPU 50 selects a path for directly outputting the processed pixel data DAT2 input from the image processing module 43-2 to the arithmetic section 333-3 without temporarily storing the processed pixel data DAT2 in the input buffer 331-3 according to a parameter of the selector 332 set in the setting register 3341 provided in the control section 334-3 of the image processing module 33-3 constituting the pipeline in the image processing section 30 in the image processing device 1 may also be conceived. By adopting this configuration, the image processing section 30 can perform control so that an operation of the input buffer 331-3 provided in the image processing module 33-3 is stopped and reduce power consumption of the input buffer 331-3. Also, the stopping of the operation of the input buffer 331-3 is set by the CPU 50. However, the control section 334-3 may control the input buffer 331-3 so that the operation thereof is stopped.

Figure 8:
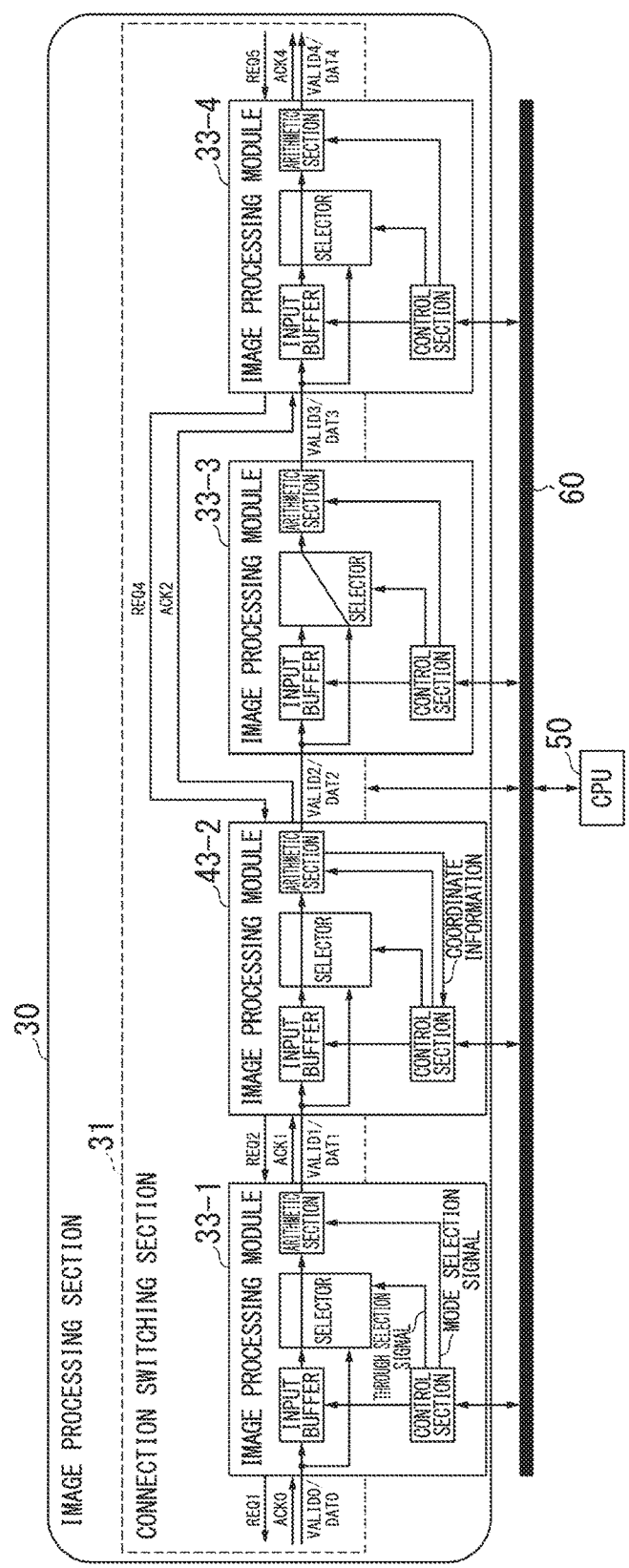
FIG. 8 is a diagram showing an example of another connection of the image processing modules in the image processing section provided in the image processing device of the embodiment of the present invention.

Next, the operation of each processing module when the image processing section 30 is configured to perform the arithmetic operation of image processing as it is without temporarily storing the input data in the data buffer will be described. FIG. 8 is a diagram showing an example of another connection of the image processing modules (the image processing module 33 and the image processing module 43) in the image processing section 30 provided in the image processing device 1 of the embodiment of the present invention. In FIG. 8, as in the example of the connection of the image processing modules shown in FIG. 6, a configuration in which a series of pipeline processing is performed according to the pipeline configuration in which the image processing module 33-1, the image processing module 43-2, the image processing module 33-3, and the image processing module 33-4 are connected in series is shown. Also, in FIG. 8, similar to the example of the pipeline configuration shown in FIG. 6, the illustration of the input DMA module 32 and the output DMA module 34 provided in the image processing section 30 is omitted.

As in the example of the pipeline configuration shown in FIG. 6, the example of the pipeline configuration shown in FIG. 8 is, for example, the pipeline configuration in which the image processing module 33-1 performs the YC processing, the image processing module 43-2 performs the distortion correction process of distortion aberration, the image processing module 33-3 performs the noise reduction process, and the image processing module 33-4 performs the edge enhancement process.

Also, in FIG. 8, in order to distinguish between component elements provided in each of the image processing modules, the component element is indicated by adding given to each of the image processing module and a numeral portion subsequent to subsequently to a reference numeral assigned to each component element. Each of the input signals and output signals within the connection switching section 31 is indicated by adding a numeral portion, which is subsequent to given to the image processing module of a side which outputs the signal, to a reference numeral thereof.

In the example of the pipeline configuration of FIG. 8, the CPU 50 sets a parameter of the selector 332-3 indicating that the input data DAT which has been input is transferred to the arithmetic section 333-3 as it is without being temporarily stored, in the setting register 3341-3 provided in the control section 334-3 of the image processing module 33-3. Thereby, the control section 334-3 of the image processing module 33-3 outputs a through selection signal for selecting a path for directly outputting the processed pixel data DAT2 input from the image processing module 43-2 of the previous stage to the arithmetic section 333 without temporarily storing the processed pixel data DAT2 in the input buffer 331-3 to the selector 332-3 and the selector 332-3 transfers the processed pixel data DAT2 currently input from the image processing module 43-2 to the arithmetic section 333.

Also, in the example of the pipeline configuration of FIG. 8, the CPU 50 changes connections of the data request signal REQ and the data acknowledge signal ACK of the image processing module 43-2 and the image processing module 33-4 in the connection switching section 31 by selecting a path for transferring the input processed pixel data DAT2 to the arithmetic section 333-3 as it is in the image processing module 33-3.

More specifically, in the example of the pipeline configuration of FIG. 8, the connection switching section 31 connects an input terminal of the data request signal REQ of the image processing module 43-2 and an output terminal of the data request signal REQ of the image processing module 33-4 of the subsequent stage and connects an output terminal of the data acknowledge signal ACK of the image processing module 43-2 and an input terminal of the data acknowledge signal ACK of the image processing module 33-4 of the subsequent stage. Thereby, the data request signal REQ4, which is an output signal of the image processing module 33-4 in the stage subsequent to the image processing module 43-2, is input to the image processing module 43-2, and the data acknowledge signal ACK2, which is an output signal of the image processing module 43-2, is input to the image processing module 33-4 in the stage subsequent to the image processing module 43-2. That is, in the example of the pipeline configuration of FIG. 8, the image processing module 43-2 of the further previous stage receives the data request signal REQ4, for requesting the image processing module 33-3 of the previous stage to output the processed pixel data DAT3 when the image processing module 33-4 output, and the image processing module 43-2 is connected so that the data acknowledge signal ACK2 according to input the data request signal REQ4 is output to the image processing module 33-4 of the further subsequent stage.

This is because the image processing module 33-3 has a configuration in which the arithmetic operation of image processing is performed by transferring the processed pixel data DAT2 input from the image processing module 43-2 to the arithmetic section 333-3 as it is and therefore the arithmetic section 433-2 provided in the image processing module 43-2 and the arithmetic section 333-3 provided in the image processing module 33-3 function as a single arithmetic section.

Even when the arithmetic section 433-2 and the arithmetic section 333-3 function as a single arithmetic section, the order in which the arithmetic operation of image processing is not changed. Thus, the connection switching section 31 connects output terminals of the data validity signal VALID and the input data DAT of the image processing module 43-2 in the stage previous to the image processing module 33-3 and input terminals of the data validity signal VALID and the input data DAT of the image processing module 33-3. Also, the connection switching section 31 connects input terminals of the data validity signal VALID and the input data DAT of the image processing module 33-4 in the stage subsequent to the image processing module 33-3 and output terminals of the data validity signal VALID and the input data DAT of the image processing module 33-3. Thereby, the data validity signal VALID2 and the processed pixel data DAT2, which are output signals of the image processing module 43-2, are input to the image processing module 33-3 of the subsequent stage, and the data validity signal VALID3 and the processed pixel data DAT3, which are output signals of the image processing module 33-3, are input to the image processing module 33-4 of the subsequent stage.

Also, the parameters of the selector 332 in the setting register 3341 provided in the control section 334 of the image processing module 33 and the setting register 3341 provided in the control section 434 of the image processing module 43 are similar to that in the example of the pipeline configuration shown in FIG. 6. Accordingly, the image processing module 33-1 and the image processing module 33-4 reads after being temporarily stored the input data DAT in the input buffer 331 and transfer the read input data DAT to the arithmetic section 333. Also, the image processing module 43 reads after being temporarily stored the input data DAT in the input buffer 431 and transfer the read input data DAT to the arithmetic section 433. Thus, connections of the data request signal REQ2, the data acknowledge signal ACK1, the input data DAT1, and the data validity signal VALID1 between the image processing module 33-1 and the image processing module 43-2 in the connection switching section 31 are similar to the example of the pipeline configuration shown in FIG. 6.

As shown in FIG. 8, by constructing a pipeline configuration in which each the processing modules are connected, the image processing section 30 performs a series of image processing (pipeline processing) in which YC processing, a distortion correction process of distortion aberration, a noise reduction process, and an edge enhancement process on each the block image data. In this pipeline processing, the image processing module 43-2 and the image processing module 33-3 provided in the image processing section 30 operate as a single image processing module that performs the distortion correction process of the distortion aberration and the noise reduction process, and sequentially output the generated processed pixel data DAT3 to the image processing module 33-4 of the subsequent stage. That is, in the example of the pipeline configuration of FIG. 8, an operation is performed so that the input buffer 431-2 provided in the image processing module 43-2 absorbs a delay in processing in both the arithmetic section 433-2 and the arithmetic section 333-3 and the pipeline processing is smoothly performed without a delay in a flow of the processed pixel data DAT from the image processing module 43-2 to the image processing module 33-4.

Figure 9:
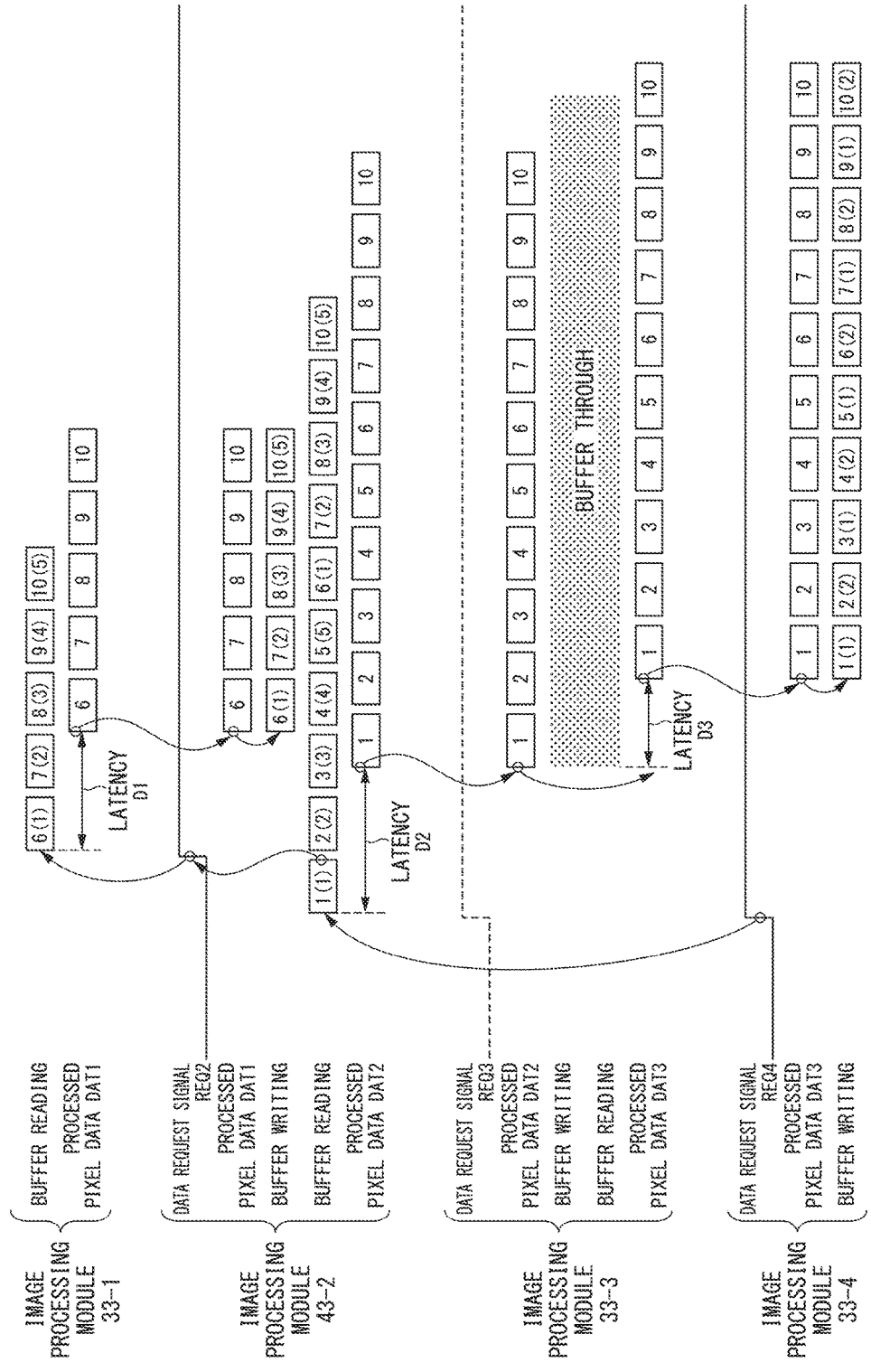
FIG. 9 is a timing chart showing an example of other operations of the image processing modules in the image processing section provided in the image processing device of the embodiment of the present invention.

FIG. 9 is a timing chart showing an example of other operations of the image processing modules (the image processing module 33 and the image processing module 43) in the image processing section 30 provided in the image processing device 1 of the embodiment of the present invention. In FIG. 9, an example of delivery of the processed pixel data from the image processing module 33-1 to the image processing module 33-4 when the image processing section 30 performs a series of pipeline processing according to the pipeline configuration shown in FIG. 8 is shown.

Also, in the example of the operation of each processing module shown in FIG. 9, as in the example of the operation of each processing module shown in FIG. 7 in the case of the pipeline processing in the pipeline configuration of FIG. 6, input data and output data (the processed pixel data DAT), the data request signal REQ, and the buffer control signal (the buffer writing signal and the buffer reading signal) in each processing module are shown. Also, in the example of the operation of each processing module shown in FIG. 9, the timings of the data acknowledge signal ACK and the data validity signal VALID are assumed to be similar to that of the output data (the processed pixel data DAT) and the illustration of the data acknowledge signal ACK and the data validity signal VALID in each processing module is omitted.

Also, in the description of FIG. 9, as in the example of the operation of each processing module shown in FIG. 7, it is assumed that image processing is performed using one unit line as one unit of processing and numbers indicating the number of a unit line is shown with respect to each of the input data (the processed pixel data DAT), the buffer writing period, the buffer reading period, and the output data (the processed pixel data DAT). Also, in the description of FIG. 9, as in the example of the operation of each processing module shown in FIG. 7, it is assumed dial the number indicating the unit line storage region 4311 within the input buffer 331 and the input buffer 431 temporarily storing the processed pixel data DAT is shown within "( ): parentheses" subsequent to the number indicating the number of the unit line shown in each of periods during which the buffer writing and the buffer reading.

Also, in the description of FIG. 9, the storage capacity of the input buffer 331 or the input buffer 431 provided in each processing module, that is, the number of the unit line storage region 3311 or the unit line storage region 4311, is assumed to be similar to that in the example of the operation of each processing module shown in FIG. 7. However, in the pipeline configuration shown in FIG. 8, because the image processing module 33-3 selects the path for transferring the input processed pixel data DAT2 to the arithmetic section 333-3 as it is, a configuration of the image processing module 33-3 is similar to a configuration in which no input buffer 331-3 is provided.

Also, in the description of FIG. 9, as in the example of the operation of each processing module shown in FIG. 7, an operation from a state in which the processed pixel data DAT1 for the five unit lines is already temporarily stored in the input buffer 431-2 provided in the image processing module 43-2 and input data (pixel data) for five unit lines to be processed the next time's already temporarily stored in the input buffer 331-1 provided in the image processing module 33-1 after the image processing section 30 starts pipeline processing will be described.

Also, in FIG. 9, as in the example of the operation of each processing module shown in FIG. 7, a period during which the data request signal REQ has a "High" level represents the request period during which each processing module is in a state in which it is possible to receive the processed pixel data DAT and a period during which the data request signal REQ has a "Low" level represents the request negate period during which each processing module is in a state in which it is not possible to receive the processed pixel data DAT.

During the above-described state, when the control section 334-4 provided in the image processing module 33-4 outputs the data request signal REQ4 for requesting the output of the processed pixel data DAT3 to the image processing module 43-2, the control section 434-2 provided in the image processing module 43-2 outputs the data acknowledge signal ACK2 in accordance with the data request signal REQ4 input from the image processing module 33-4 of the subsequent stage. Then, the control section 434-2 generates the buffer reading signal for reading the processed pixel data DAT1 of the first unit line temporarily stored in the input buffer 431-2. Thereby, during the buffer reading period of the first unit line, the processed pixel data DAT1 read from the first unit line storage region 4311-2 of the input buffer 431-2 is transferred to the arithmetic section 433-2 via the selector 332-2. Then, the arithmetic section 433-2 outputs the processed pixel data DAT2 generated by performing an arithmetic operation of a distortion correction process of distortion aberration according to the mode selection signal output from the control section 434-2 on the processed pixel data DAT1 of the first unit line input via the selector 332-2, to the image processing module 33-3 from a timing at which the processed pixel data DAT2 has been delayed by the delay time D2 (latency D2).

The subsequent operations of the image processing module 43-2 and the image processing module 33-1 are similar to the example of the operation of each processing module shown in FIG. 7. Accordingly, a detailed description of the operations of the image processing module 43-2 and the image processing module 33-1 will be omitted.

When the image processing module 33-3 receives the input processed pixel data DAT2 corresponding to the first unit line from the image processing module 43-2 of the previous stage, the selector 332-3 provided in the image processing module 33-3 transfers the input processed pixel data DAT2 to the arithmetic section 333-3 as it is. Then, the arithmetic section 333-3 outputs the processed pixel data DAT3 generated by performing an arithmetic operation of the noise reduction process on the processed pixel data DAT2 of the first unit line input from the image processing module 43-2 of the previous stage via the selector 332-3 according to the mode selection signal output from the control section 334-3, to the image processing module 33-4 from a timing at which the processed pixel data DAT3 has been delayed by the delay time D3 (latency D3).

Thereafter, when the image processing module 33-3 receives an input of the processed pixel data DAT2 of the second unit line from the image processing module 43-2 of the previous stage, the selector 332-3 transfers the input processed pixel data DAT2 to the arithmetic section 333-3 as it is. Thereby, the arithmetic section 333-3 performs an arithmetic operation of a noise reduction process on the processed pixel data DAT2 of the second unit line and outputs the generated processed pixel data DAT3 to the image processing module 33-4.

Thereafter, likewise, in the image processing module 33-3, the processed pixel data DAT3 generated by the arithmetic section 333-3 performing the arithmetic operation of the noise reduction process on the processed pixel data DAT2 of each unit line sequentially input from the image processing module 43-2 of the previous stage is sequentially outputs to the image processing module 33-4.

In this manner, the image processing module 33-3 sequentially outputs the processed pixel data DAD generated by directly performing the noise reduction process on the processed pixel data DAT2 sequentially input from the image processing module 43-2 of the previous stage to the image processing module 33-4 of the subsequent stage.

Then, the image processing module 33-4 sequentially outputs the generated processed pixel data DAT4 to the processing module (for example, the output DMA module 34) of the subsequent stage by sequentially performing an edge enhancement process on the processed pixel data DAD sequentially input from the image processing module 33-3 of the previous stage. Also, the operation of the image processing module 33-4 is similar to an example of the operation of each processing module shown in FIG. 7. Accordingly, a detailed description of the operation of the image processing module 33-4 will be omitted.

In this manner, in the image processing section 30 of the pipeline configuration shown in FIG. 8, as in the image processing section 30 having the pipeline configuration shown in FIG. 6, it is also possible to perform a series of pipeline processing while avoiding the pipeline stall state. Moreover, in the image processing section 30 having the pipeline configuration shown in FIG. 8, the arithmetic section 433-2 provided in the image processing module 43-2 and the arithmetic section 333-3 provided in the image processing module 33-3 function as a single arithmetic section, and processing delays in both the arithmetic section 433-2 and the arithmetic section 333-2 are absorbed by the storage capacity of the input buffer 431-2 provided in the image processing module 43-2. That is, in the image processing section 30 having the pipeline configuration shown in FIG. 8, the image processing module 43-2 has arithmetic functions of a plurality of pieces of image processing (a resizing process, a distortion correction process, a shape correction process, and the like) and hence the input buffer 431-2 absorbs a delay time of a sum of the latency D2 in the arithmetic section 433-2 and the latency D3 in the arithmetic section 333-3 by using the fact that has many unit line storage regions 4311-2 which have been provided. In other words, in the image processing section 30 having the pipeline configuration shown in FIG. 8, the input buffer 431-2 provided in the image processing module 43-2 is handled as data buffers (input buffers) provided in processing modules of both the image processing module 43-2 and the image processing module 33-3, so that the input buffer 431-2 is used to absorb the latency D3 in the arithmetic section 333-3 in addition to the absorption of the latency D2 in the arithmetic section 433-2. That is, the input buffer 431-2 is used instead of the input buffer 331-3 as a buffer for the arithmetic section 333-3 provided in the image processing module 33-2. Thereby, in the image processing section 30 having the pipeline configuration shown in FIG. 8, it is possible to perform control so that the operation of the input buffer 331-3 provided in the image processing module 33-3 is stopped and to reduce the power consumption of the input buffer 331-3. Also, the stopping of the operation of the input buffer 331-3 is set by the CPU 50. However, the control section 334-3 may control the input buffer 331-3 so that the operation thereof is stopped.

Figure 10:
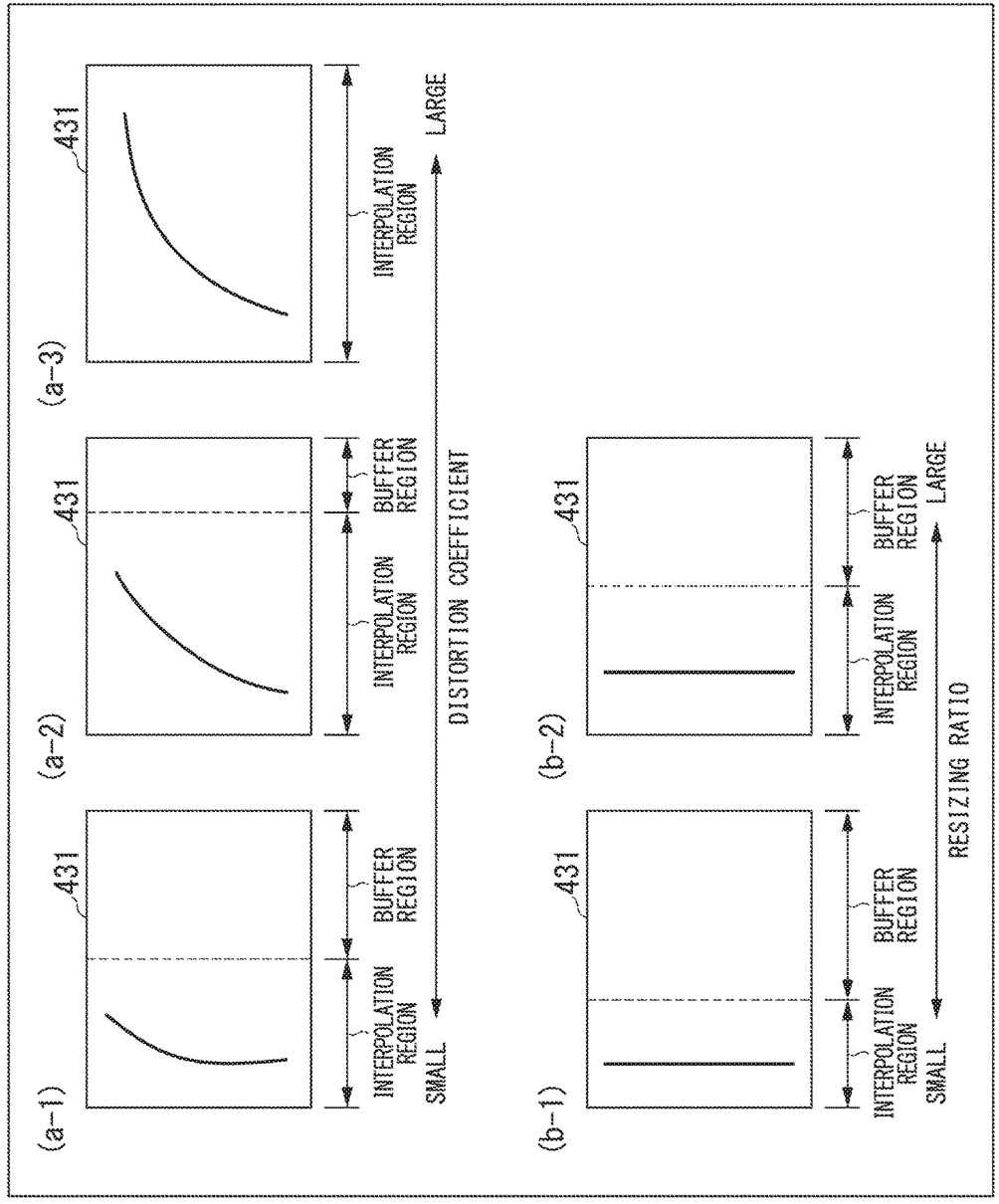
FIG. 10 is a diagram showing an example of a relationship between a storage capacity of an input buffer provided in the image processing module in the image processing section provided in the image processing device of the embodiment of the present invention and a storage capacity of the input buffer used for image processing.

Here, a concept in which arithmetic sections provided in a plurality of processing modules constituting a pipeline in the image processing section 30 function as a single arithmetic section and processing delays in a plurality of arithmetic sections are absorbed by the data buffer (the input buffer) provided in any processing module will be described. FIG. 10 is a diagram showing an example of a relationship between the storage capacity of the input buffer 431 provided in the image processing module 43 of the image processing section 30 of the image processing device 1 of the embodiment of the present invention and the storage capacity of the input buffer 431 used for image processing. In FIG. 10, an example of a relation between the storage capacity of the input buffer 431 provided in the image processing module 43 and the number of unit lines of pixel data necessary for image processing executed by the image processing module 43, that is, an actually used storage capacity, is schematically shown.

As described with reference to FIG. 5, the number of unit lines required in the image processing module 43, that is, the number of unit line storage regions 4311, differs according to parameters such as a value of a distortion coefficient and a value of a resizing ratio set by the CPU 50 in accordance with the executed image processing. Thus, in the storage capacity of the input buffer 431-2 provided in the image processing module 43-2, the storage capacity available instead of the input buffer 331-3 provided in the image processing module 33-3, that is, the remaining storage capacity, differs according to an arithmetic operation of image processing executed by the image processing module 43-2. In FIG. 10, a relationship between the range of a storage region (hereinafter referred to as an "interpolation region") representing the storage capacity of the input buffer 431-2 used when the image processing module 43-2 performs image processing (an image interpolation process) and the range of a storage region (hereinafter referred to as a "buffer region") representing the storage capacity available instead of the input buffer 331-3 provided in the image processing module 33-3 is schematically shown.

For example, when the image processing module 43-2 performs the distortion correction process of the distortion aberration, the number of unit lines of the pixel data necessary for the distortion correction process is determined according to the value (parameter) of the distortion coefficient set in the setting register 3341 by the CPU 50 on the basis of characteristics of the distortion aberration of the lens provided in the imaging device. Thus, as shown in (a-1) of FIG. 10 to (a-3) of FIG. 10, in the input buffer 431-2 provided in the image processing module 43-2, an interpolation region corresponding to the number of unit lines used to perform the distortion correction process of distortion aberration (the image interpolation process) and a buffer region available instead of the input buffer 331-3 provided in the image processing module 33-3 differ according to each value of the distortion coefficient.

More specifically, if the value of the distortion coefficient is small, as shown in (a-1) in FIG. 10, the interpolation region within the input buffer 431-2 is a narrow range and the buffer region of a wide range can be used instead of the input buffer 331-3 provided in the image processing module 33-3, because the image processing module 43-2 can perform the distortion correction process of the distortion aberration using pixel data of a small number of unit lines. That is, a buffer region of a wide range can be secured within the input buffer 431-2. Thus, in the image processing module 43-2, as long as the buffer region is within the range of the buffer region secured in the input buffer 431-2, it is possible to use the input buffer 431-2 instead of the input buffer 331-3 even when the input buffer 331-3 provided in the image processing module 33-3 is a data buffer provided with many unit line storage regions 3311-3.

However, as shown in (a-2) of FIG. 10 and (a-3) of FIG. 10, as the value of the distortion coefficient increases, the number of unit lines used for the distortion correction process of the distortion aberration increases and the interpolation region in the input buffer 431-2 is a wide range. In other words, the buffer region capable of being secured within the input buffer 431-2 becomes narrow inversely as the value of the distortion coefficient increases. Thus, in the image processing module 43-2, it becomes difficult to use the input buffer 431-2 instead of the input buffer 331-3.

Also, for example, if the image processing module 43-2 performs a resizing process, the number of unit lines of pixel data necessary for the resizing process is determined according to the value (the parameter) of the resizing ratio set in the setting register 3341 by the CPU 50. Thus, as shown in (b-1) of FIG. 10 and (b-2) of FIG. 10, in the input buffer 431-2 provided in the image processing module 43-2, an interpolation region corresponding to the number of unit lines used to perform the resizing process (image interpolation process) and a buffer region available instead of the input buffer 331-3 provided in the image processing module 33-3 differ according to each value of the resizing ratio.

More specifically, for example, if the image is reduced, when the value of the resizing ratio is small, as shown in (b-1) of FIG. 10, the interpolation region within the input buffer 431-2 is a narrow range and a buffer region of a wide range can be secured, because the image processing module 43-2 can perform the resizing process by reading pixel data of a predetermined position within a range of a small number of unit lines. Thus, in the image processing module 43-2, the secured buffer region can be used instead of the input buffer 331-3 provided in the image processing module 33-3.

On the other hand, if the value of the resizing ratio is large, as shown in (b-2) of FIG. 10, the interpolation region within the input buffer 431-2 is a wide range because the image processing module 43-2 performs the resizing process by reading pixel data of a predetermined position within a range of a larger number of unit lines, and a buffer region capable of being secured within the input buffer 431-2 is a narrow range inversely when the value of the resizing ratio is large. Thus, in the image processing module 43-2, it becomes difficult to use the input buffer 431-2 instead of the input buffer 331-3.

Also, if the image processing module 43 performs a distortion correction process of a magnification chromatic aberration, if a shape correction process such as trapezoidal correction is performed, if another filtering process is performed, or the like, a method of determining the storage capacity of the input buffer 431 can be considered to be similar to an example shown in FIG. 10.

When image processing (pipeline processing) to be executed in the image processing section 30 is determined, the CPU 50 configures a pipeline in the image processing section 30 on the basis of the above-described concepts. That is, because each processing module to be connected in series in the pipeline is determined when the pipeline processing to be executed in the image processing section 30 is determined, the CPU 50 can ascertain the storage capacity of the data buffer provided in each processing module and the storage capacity actually used by each processing module. At this time, the CPU 50 obtains the size of the buffer region capable of being secured within the data buffet provided in each processing module constituting the pipeline. Then, the CPU 50 sets a path of data flowing into the pipeline configuration on the basis of each of the ascertained storage capacities. In other words, the CPU 50 determines for each processing module constituting the pipeline on the basis of the size of the obtained buffer region, whether to read the input data in the data buffer after temporarily storing the input data and transfer the read input data to the arithmetic section or whether to transfer the input data to the arithmetic section as it is.

More specifically, for example, in the example of the pipeline configuration shown in FIG. 6 and FIG. 8, the CPU 50 obtains a size of the buffer region capable of being secured within the input buffer 431-2 provided in the image processing module 43-2, that is, the number of unit lines (the number of unit line storage regions 4311-2). Then, on the basis of the obtained buffer region (the number of unit lines) in the input buffer 431-2, in the image processing module 33-3, the CPU 50 determines whether to select a path which reads after being temporarily stored the processed pixel data DAT2 in the input buffer 331-3 and transferred to the arithmetic section 333-3 or whether to select a path along which the processed pixel data DAT2 is transferred to the arithmetic section 333-3 as it is. Then, on the basis of the path determined here, the CPU 50 sets a parameter of the selector 332-3 which selects a path along which the processed pixel data DAT2 is transferred to the arithmetic section 333-3 in the setting register 3341-3 within the control section 334-3 provided in the image processing module 33-3. That is, if the obtained buffer region (the number of unit lines) of the input buffer 431-2 is larger than the number of unit lines (the number of unit line storage regions 3311-3) for temporarily storing the processed pixel data DAT2 in the input buffer 331-3 provided in the image processing module 33-3, the CPU 50 sets a parameter of the selector 332-3 indicating that the input processed pixel data DAT2 is transferred to the arithmetic section 333-3 as it is. On the other hand, if the obtained buffer region (the number of unit lines) of the input buffer 431-2 is smaller than the number of unit lines for temporarily storing the processed pixel data DAT2 in the input buffer 331-3 provided in the image processing module 33-3, the CPU 50 sets the parameter of the selector 332-3 indicating that the input processed pixel data DAT2 is read and transferred to the arithmetic section 333-3 after being temporarily stored in the input buffer 331-3. Then, on the basis of the path determined here, the CPU 50 performs control (setting) to the connection switching section 31 for switching the connection of each processing module constituting the pipeline within the image processing section 30 with respect.

Also, for example, the image processing module 33-3 may also be configured to have arithmetic functions of a plurality of pieces of image processing. In this case, the number of unit lines (the number of unit line storage regions 3311-3) for temporarily storing the processed pixel data DAT2 in the input buffer 331-3 differs according to an arithmetic operation of image processing executed by the image processing module 33-3. Thus, the CPU 50 determines whether to select a path which reads after being temporarily stored the processed pixel data DAT2 in the input buffer 331-3 and transferred to the arithmetic section 333-3 or whether to select a path along which the processed pixel data DAT2 is transferred to the arithmetic section 333-3 as it is, including the latency when the arithmetic section 333-3 provided in the image processing module 33-3 executes an arithmetic operation of image processing.

Also, in the image processing module 43-2, even after the input buffer 431-2 is used instead of the input buffer 331-3 provided in the image processing module 33-2, it is also conceivable that there may be a free (remaining) buffer region in the input buffer 431-2. In this case, it is also possible to use the free (remaining) buffer region of the input buffer 431-2 as a substitute for the data buffer provided in another processing module connected to the further subsequent stage in the pipeline configuration.

Figure 11:
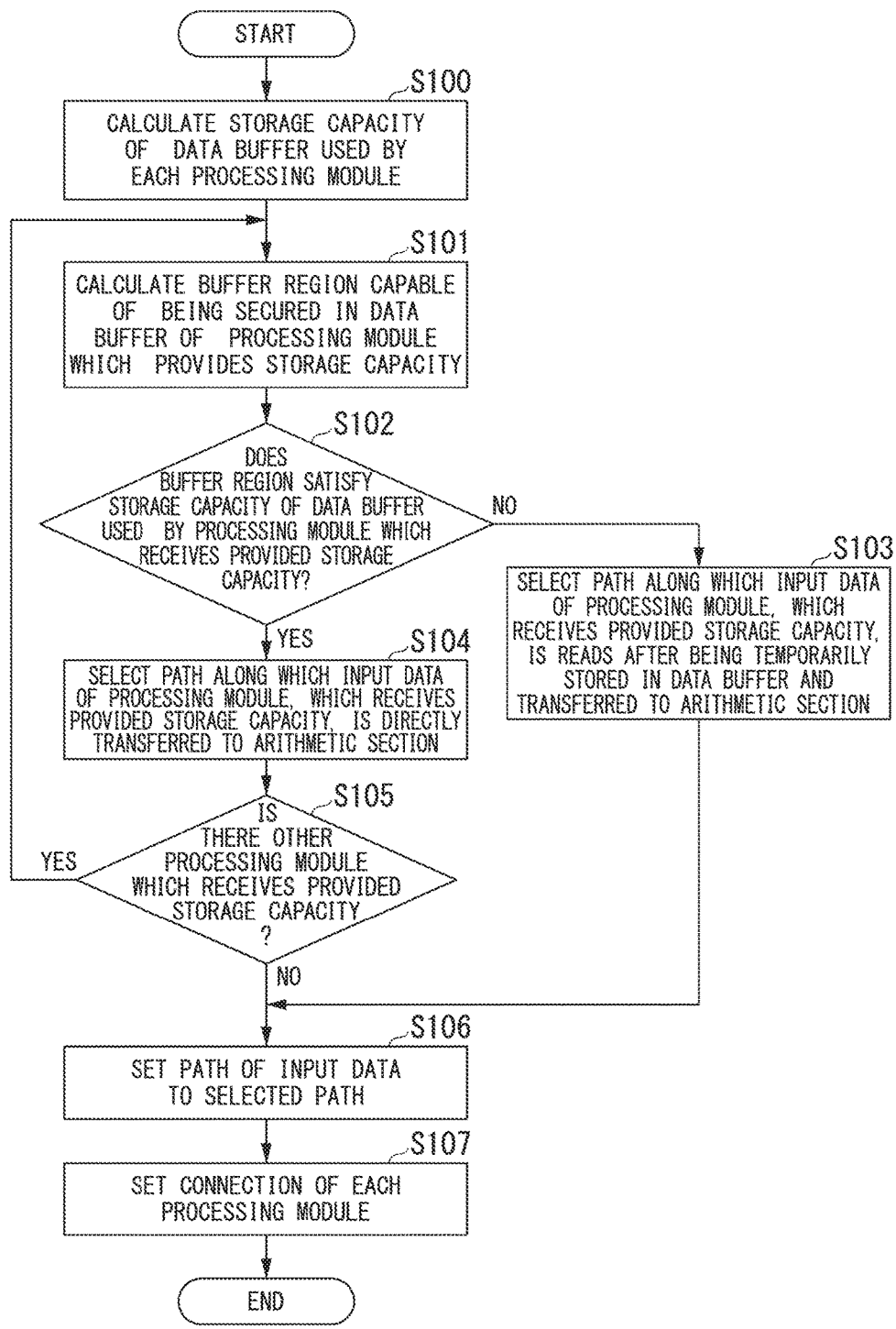
FIG. 11 is a flowchart showing a processing procedure of configuring a pipeline in the image processing section provided in the image processing device of the embodiment of the present invention.

Next, a processing procedure when the CPU 50 configures the pipeline in the image processing section 30, that is, a method of controlling a data buffer provided in each processing module by the CPU 50 will be described. FIG. 11 is a flowchart showing a processing procedure of configuring the pipeline in the image processing section 30 provided in the image processing device 1 of the embodiment of the present invention. In the following description, in the example of the pipeline configuration shown in FIG. 6 and FIG. 8, a case in which a setting for using a part of the storage capacity of the input buffer 431-2 provided in the image processing module 43-2 instead of the input buffer 331-3 provided in the image processing module 33-3 is performed will be described.

When the image processing to be executed in the image processing device 1 is determined, the CPU 50 first calculates the storage capacity of the data buffer actually used by each processing module when the image processing determined in the image processing section 30 is executed (step S100). In the example of the pipeline configuration shown in FIG. 6 and FIG. 8, the storage capacity (the interpolation region) of the input buffer 431-2 actually used by the image processing module 43-2 constituting the pipeline and the storage capacity of the input buffer 331-3 actually used by the image processing module 33-3 are calculated.

Also, the storage capacity of the input buffer 331-3 actually used by the image processing module 33-3 calculated by the CPU 50 in step S100 is a storage capacity of the input buffer 331-3 provided in the image processing module 33-3 if the image processing module 33-3 is a processing module having a configuration including a single predetermined image processing function. Even when the image processing module 33-3 executes the single image processing function, for example, the actually used storage capacity of the input buffer 331-3 may change according to a parameter such as a filter coefficient. In this case, for example, the CPU 50 calculates the storage capacity of the input buffer 331-3 actually used by the image processing module 33-3 on the basis of a parameter such as a filter coefficient. Even when the image processing module 33-3 is a processing module having arithmetic functions of a plurality of pieces of image processing, the storage capacity of the input buffer 331-3 used in the arithmetic operation of image processing executed by the image processing module 33-3 is the storage capacity of the input buffer 331-3 actually used by the image processing module 33-3 calculated by the CPU 50 in step S100.

Also, in step S100, on the basis of the image processing (the image interpolation process) performed by the image processing module 43-2 and a set value (a parameter) of the image processing (the image interpolation process), the CPU 50 calculates the storage capacity (the interpolation region) of the input buffer 431-2 actually used by the image processing module 43-2.

Subsequently, the CPU 50 calculates 3 storage capacity (a buffer region) capable of being secured in the data buffer of the processing module that provides the storage capacity (step S101). In the example of the pipeline configuration shown in FIG. 6 and FIG. 8, a buffer region capable of being secured in the input buffer 431-2 provided in the image processing module 43-2 which is a processing module for providing a storage capacity is calculated.

Also, in step S101, the CPU 50 calculates the storage capacity (the buffer region) capable of being secured in the input buffer 431-2 of the image processing module 43-2 by taking a difference between the total storage capacity of the input buffer 431-2 and the storage capacity (the interpolation region) of the input buffer 431-2 actually used by the image processing module 43-2 calculated in Step S100.

Subsequently, the CPU 50 determines whether or not the calculated buffer region satisfies the storage capacity of the data buffer used by the processing module which receives the provided storage capacity (step S102). In the example of the pipeline configuration shown in FIG. 6 and FIG. 8, it is determined whether or not the buffer region calculated in step S101 satisfies the storage capacity calculated in step S100 with respect to the image processing module 33-3 which is a processing module which receives the provided storage capacity of the input buffer 431-2 provided in the image processing module 43-2.

If it is determined that the calculated buffer region does not satisfy the storage capacity of the data buffer used by the processing module which receives the provided storage capacity in step S102 ("NO" in step S102), the CPU 50 selects a path for reading the input data of the processing module which receives the provided storage capacity and transferring the read input data to the arithmetic section after the input data is temporarily stored in the data buffer (step S103). That is, if the buffer region (the storage capacity) secured in the input buffer 431-2 is less than the storage capacity of the input buffer 331-3 used when the image processing module 33-3 executes image processing, the CPU 50 selects the path which reads after being temporarily stored the input data (the processed pixel data DAT2) of the image processing module 33-3 in the input buffer 331-3 and transferring to the arithmetic section 333-3.

On the other hand, if it is determined that the calculated buffer region satisfies the storage capacity of the data buffer used by the processing module which receives the provided storage capacity in step S102 ("YES" in step S102), the CPU 50 selects a path for directly transferring the input data of the processing module which receives the provided storage capacity to the arithmetic section (step S104). That is, if the buffer region (the storage capacity) secured in the input buffer 431-2 is greater than or equal to the storage capacity of the input buffer 331-3 used when the image processing module 33-3 executes image processing, the CPU 50 selects the path along which the input data (the processed pixel data DAT2) of the image processing module 33-3 is transferring to the arithmetic section 333-3 as it is.

Subsequently, the CPU 50 determines whether or not there is another processing module to receive the storage capacity (step S105). That is, the CPU 50 confirms whether or not there is a processing module other than the image processing module 33-3 that provides the buffer region (the storage capacity) secured in the input buffer 431-2.

If it is determined that there is another processing module to receive the storage capacity in step S105 ("YES" in step S105), the CPU 50 returns to step S101 and calculates the remaining buffer region (storage capacity) after the buffer region (the storage capacity) secured in the input buffer 431-2 is provided to the image processing module 33-3 and iterates the processing of step S102 to step S105.

On the other hand, if it is determined that there is no other processing module to receive the storage capacity in step S105 ("NO" in step S105), the CPU 50 proceeds to step S106.

Subsequently, the CPU 50 sets the path of the input data selected in the processing from step S101 to step S105 to each processing module constituting the pipeline (step S106). More specifically, if the path of the input data (the processed pixel data DAT2) in the image processing module 33-3 is selected in step S103, the CPU 50 sets the parameter of the selector 332-3 indicating that the input processed pixel data DAT2 is read and transferred to the arithmetic section 333-3 after being temporarily stared in the input buffer 331-3 in the setting register 3341-3 within the control section 334-3 provided in the image processing module 33-3. On the other hand, if the path of the input data (the processed pixel data DAT2) in the image processing module 33-3 is selected in step S104, the CPU 50 sets the parameter of the selector 332-3 indicating that the input processed pixel data DAT2 is transferred to the arithmetic section 333-3 as it is.

Subsequently, the CPU 50 sets the connection switching of each processing module constituting the pipeline in the connection switching section 31 (step S107). More specifically, if the image processing module 33-3 selects a path for transferring the input data to the arithmetic section after the input data is temporarily stored in the data buffer in step S103, the CPU 50 controls the connection switching section 31 so that the output terminal of the data request signal REQ of the image processing module 33-3 and the input terminal of the data request signal REQ of the image processing module 43-2 are connected together and the output terminal of the data acknowledge signal ACK of the image processing module 43-2 and the input terminal of the data acknowledge signal ACK of the image processing module 33-3 are connected together. On the other hand, if the image processing module 33-3 selects the path for directly transferring the input data to the arithmetic section in step S104, the CPU 50 controls the connection switching section 31 so that the output terminal of the signal REQ of the image processing module 33-4 in the stage subsequent to the image processing module 33-3 and the input terminal of the data request signal REQ of the image processing module 43-2 are connected together and the output terminal of the data acknowledge signal ACK of the image processing module 43-2 and the input terminal of the acknowledge signal ACK of the image processing module 33-4 are connected together.

According to the processing of step S106 and step S107, a pipeline as in the example of the pipeline configuration shown in FIG. 6 or FIG. 8 is configured within the image processing section 30. Also, the CPU 50 performs the above-described processing every time image processing (pipeline processing) to be executed by the image processing section 30 is determined. Thereby, in the image processing device 1, an optimum pipeline configuration is constructed for each image processing (pipeline processing) of the image processing section 30 that has been determined.

As described above, in the image processing device 1, the image processing section 30 causes the arithmetic sections provided in the plurality of processing modules constituting the pipeline to function as a single arithmetic section and uses a storage capacity, which remains without being used in the arithmetic operation of image processing in the data buffer provided in the processing module capable of temporarily storing pixel data of a large number of unit lines, instead of the data buffer provided in another processing module.

Figure 12:
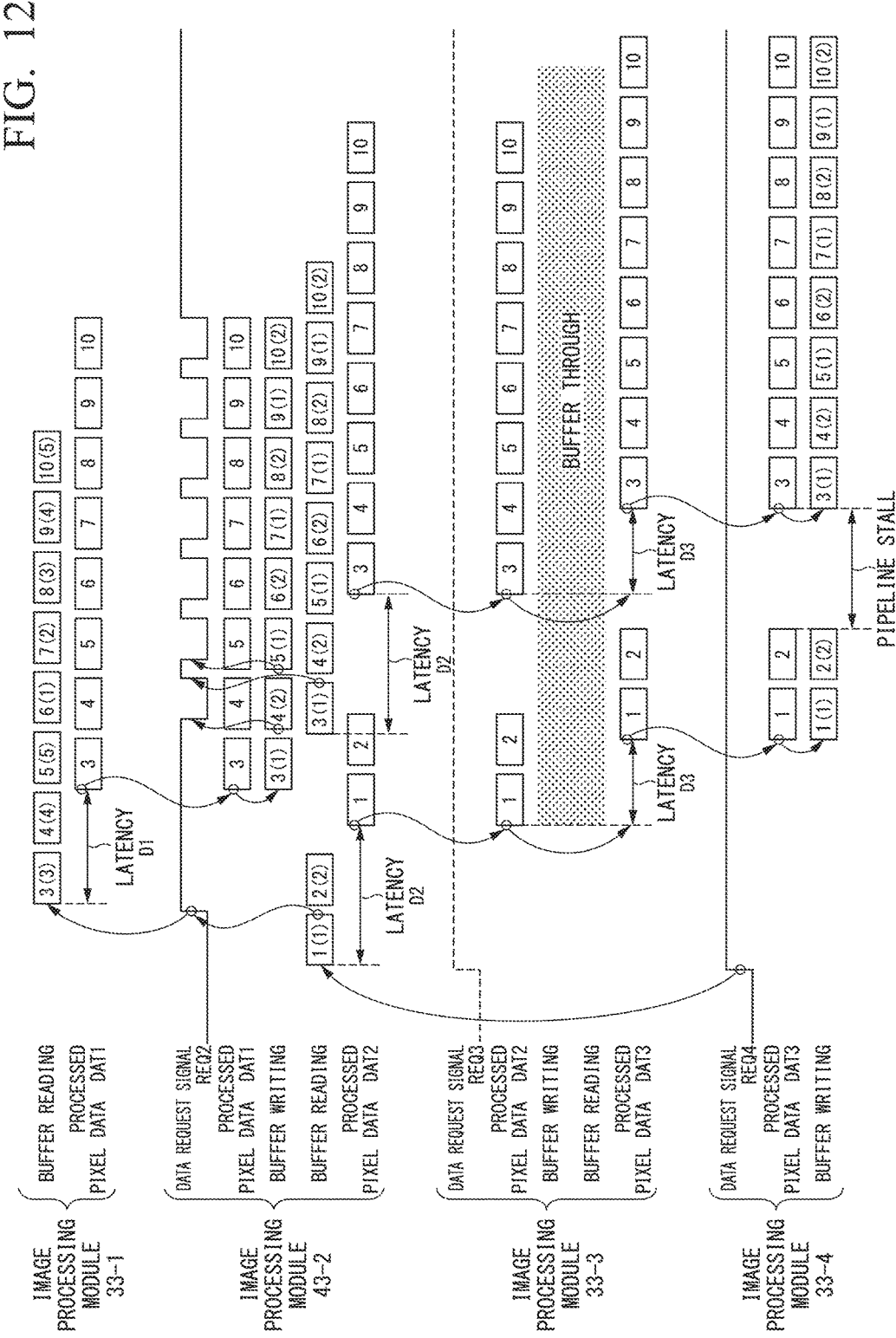
FIG. 12 is a timing chart showing an example of an operation of the image processing module when different settings are made in the image processing section provided in the image processing device of the embodiment of the present invention.

Here, an operation of each processing module when a configuration in which the input data is transferred to the arithmetic section as it is even though the storage capacity (the remaining storage capacity) capable of being used instead of the data buffer provided in another processing module is small is adopted will be described. FIG. 12 is a timing chart showing an example of the operation of the image processing module (the image processing module 33 and the image processing module 43) when different settings are made in the image processing section 30 provided in the image processing device 1 of the embodiment of the present invention. In FIG. 12, an example of delivery of the processed pixel data from the image processing module 33-1 to the image processing module 33-4 when the image processing section 30 performs a series of pipeline processing according to the pipeline configuration shown in FIG. 8 is shown. An example of the operation of each processing module shown in FIG. 12 is an example showing the advantageous effects of the image processing device 1 of the present invention, and is different from the operation executed in the image processing device 1 of the present invention.

Also, in the example of the operation of each processing module shown in FIG. 12, as in the example of the operation of each processing module in the image processing device 1 of the present invention shown in FIG. 9, input data and output data (the processed pixel data DAT), the data request signal REQ, and the buffer control signal (the buffer writing signal and the buffer reading signal) in each processing module are shown. Also, in the example of the operation of each processing module shown in FIG. 12, the timings of the data acknowledge signal ACK and the data validity signal VALID are assumed to be similar to that of the output data (the processed pixel data DAT) and the illustration of the data acknowledge signal ACK and the data validity signal VALID in each processing module is omitted.

Also, in the description of FIG. 12, as in the example of the operation of each processing module in the image processing device 1 of the present invention shown in FIG. 9, it is assumed that image processing is performed using one unit line as one unit of processing and a numbers indicating the number of a unit line is shown with respect to each of the input data (live processed pixel data DAT), the buffer writing period, the buffer reading period, and the output data (the processed pixel data DAT). Also, in the description of FIG. 12, as in the example of the operation of each processing module in the image processing device 1 of the present invention shown in FIG. 9, it is assumed that the number indicating the unit line storage region 4311 within the input buffer 331 and the input buffer 431 temporarily storing the processed pixel data DAT is shown within "( ): parentheses" subsequent to the number indicating the number of the unit line shown in each of periods during which the buffer writing and the buffer reading.

Also, in the description of FIG. 12, it is assumed that the image processing module 33-1 includes the input buffer 331 having the storage capacity capable of storing the processed pixel data DAT0 for five unit lines, and each of the image processing module 33-3 and the image processing modules 33-4 includes the input buffer 331 having the storage capacity capable of storing the processed pixel data DAT for two unit lines. However, in the description of FIG. 12, in order to indicate that the storage capacity (the remaining storage capacity) available instead of the input buffer 331 provided in the image processing module 33-3 is small, it is assumed that the image processing module 43-2 has a configuration in which the input buffer 431 having the storage capacity capable of storing processed pixel data DAT1 for two unit lines is provided. In other words, as in the example of the operation of each processing module in the image processing device 1 of the present invention shown in FIG. 9, it is assumed that the input buffer 331 provided in the image processing module 33-1 includes five unit line storage regions 3311, and the input buffer 331 provided in each of the image processing module 33-3 and the image processing module 33-4 includes two unit line storage regions 3311. It is assumed that the input buffer 431 provided in the image processing module 43-2 includes two unit line storage regions 4311 unlike the example of the operation of each processing module in the image processing device 1 of the present invention shown in FIG. 9.

Also, in the description of FIG. 12, an operation after a state in which the processed pixel data DAT1 for the two unit lines is already temporarily stored in the input buffer 431-2 provided in the image processing module 43-2 and input data (pixel data) for five unit lines to be processed the next time is already temporarily stored in the input buffer 331-1 provided in the image processing module 33-1 after the image processing section 30 starts pipeline processing will be described. That is, an operation after a slate in which the processed pixel data DAT1 of first and second unit lines is already temporarily stored in the first and second unit line storage regions 4311-2 of the input buffer 431-2 provided in the image processing module 43-2 and the processed pixel data DAT0 of third to seventh unit lines is already temporarily stored in the first to fifth unit line storage regions 3311-1 of the input buffer 331-1 provided in the image processing module 33-1 will be described.

Also in FIG. 12, as in the example of the operation of each processing module in the image processing device 1 of the present invention shown in FIG. 9, a period during which the data request signal REQ has a "High" level represents the request period during which each processing module is in a state in which it is possible to receive the processed pixel data DAT and a period during which the data request signal REQ has a "Low" level represents the request negate period during which each processing module is in a state in which it is not possible to receive the processed pixel data DAT.

During the above-described state, when the control section 334-4 provided in the image processing module 33-4 outputs the data request signal REQ4 for requesting the output of the processed pixel data DAT3 to the image processing module 43-2, the control section 434-2 provided in the image processing module 43-2 outputs the data acknowledge signal ACK2 in accordance with the data request signal REQ4 input from the image processing module 33-4 of the subsequent stage. Then, the control section 434-2 generates the buffer reading signal for reading the processed pixel data DAT1 of the first unit line temporarily stored in the input buffer 431-2. Thereby, during the buffer reading period of the first unit line, the processed pixel data DAT1 read from the first unit line storage region 4311-2 of the input buffer 431-2 is transferred to the arithmetic section 433-2 via the selector 332-2. Then, the arithmetic section 433-2 outputs the processed pixel data DAT2 generated by performing an arithmetic operation of a distortion correction process of distortion aberration according to the mode selection signal output from the control section 434-2 on the processed pixel data DAT1 of the first unit line input via the selector 332-2, to the image processing module 33-3 from a timing at which the processed pixel data DAT2 has been delayed by the delay time D2 (latency D2).

Also, when the reading of the processed pixel data DAT1 of the first unit line temporarily stored in the input buffer 431-2 is completed, subsequently, the control section 434-2 sequentially generates the buffer reading signal for reading the processed pixel data DAT1 of the second unit line from the input buffer 431-2. Thereby, the arithmetic section 433-2 outputs the processed pixel data DAT2 of the second unit line generated by performing the arithmetic operation of the distortion correction process of the distortion aberration on the processed pixel data DAT1 of the second unit line input via the selector 332-2 to the image processing module 33-3.

Also, when the control section 434-2 completes the reading of the processed pixel data DAT1 of the first unit line, the control section 434-2 sets the data request signal REQ2 output to the image processing module 33-1 to the "High" level because the input buffer 431-2 becomes in a state in which the first unit line storage region 4311-2 is free. Thereby, in accordance with the data request signal REQ2, the image processing module 33-1 outputs the processed pixel data DAT1 corresponding to the third unit line generated by performing an arithmetic operation of YC processing on the pixel data of the third unit line temporarily stored in the input buffer 331, to the image processing module 43-2 from a timing at which the processed pixel data DAT1 has been delayed by a delay time D1 (latency D1). When the processed pixel data DAT1 corresponding to the third unit line is input from the image processing module 33-1 of the previous stage, the control section 434-2 generates the buffer writing signal for writing the input processed pixel data DAT1 of the third unit line to the first unit line storage region 4311-2 free within the input buffer 431-2. Thereby, during the buffer writing period of the third unit line, the processed pixel data DAT1 corresponding to the third unit line is written to and temporarily stored in the first unit line storage region 4311-2 within the input buffer 431-2.

Also, when the control section 434-2 completes the reading of the processed pixel data DAT1 of the second unit line, the control section 434-2 maintains the data request signal REQ2 output to the image processing module 33-1 in the state of the "High" level because the input buffer 431-2 becomes in a state in which the second unit line storage region 4311-2 is free. Thereby, in accordance with the data request signal REQ2, subsequently, the image processing module 33-1 outputs the processed pixel data DAT1 corresponding to the fourth unit line generated by performing an arithmetic operation of YC processing on the pixel data of the fourth unit line temporarily stored in the input buffer 331 to the image processing module 43-2. When the processed pixel data DAT1 corresponding to the fourth unit line is input from the image processing module 33-1 of the previous stage, the control section 434-2 generates the buffer writing signal for writing the input processed pixel data DAT1 of the fourth unit line to the second unit line storage region 4311-2 free within the input buffer 431-2. Thereby, during the buffer writing period of the fourth unit line, the processed pixel data DAT1 corresponding to the fourth unit line is written to and temporarily stored in the second unit line storage region 4311-2 within the input buffer 431-2.

Also, when the control section 434-2 starts the writing of the processed pixel data DAT1 of the fourth unit line, to the second unit line storage region 4311-2 within the input buffer 431-2, the input buffer 431-2 becomes in a state in which all the unit line storage regions 4311-2 are not free. Thus, in order to indicate that the image processing module 43-2 is in a state in which it is not possible to receive the processed pixel data DAT1, the control section 434-2 sets the data request signal REQ2 to be output to the image processing module 33-1 to the "Low" level. Thereby, in accordance with the data request signal REQ2, the image processing module 33-1 stops outputting the processed pixel data DAT1 corresponding to each unit line generated by performing the arithmetic operation of YC processing on pixel data of fifth and subsequent unit lines temporarily stored in the input buffer 331 to the image processing module 43-2.

Thereafter, likewise, the control section 434-2 changes the level of the data request signal REQ2 in accordance with the state of the unit line storage region 4311-2 of the input buffer 431-2, so that the image processing module 43-2 notifies the image processing module 33-1 of a state of whether or not it is possible to receive the processed pixel data DAT1. Then, during the buffer writing period of each unit line, the control section 434-2 sequentially temporarily stores the processed pixel data DAT1 corresponding to the fifth and subsequent unit lines input from the image processing module 33-1 of the previous stage in the input buffer 431-2.

In this manner, the image processing module 43-2 reads after being temporarily stored the processed pixel data DAT1 input front the image processing module 33-1 of the previous stage in the input buffer 431-2 and sequentially outputs the processed pixel data DAT2 generated by the distortion correction process of the distortion aberration to the image processing module 33-3 of the subsequent stage.

Meanwhile, in the image processing module 43-2, as shown in FIG. 12, when reading of the processed pixel data DAT1 of the second unit line temporarily stored in the input buffer 431-2 is completed, the processed pixel data DAT1 of the third unit line is not temporarily stored in the input buffer 431-2. Thus, after the reading of the processed pixel data DAT1 of the second unit line is completed, the control section 334-4 cannot subsequently read the processed pixel data DAT1 of the third unit line from the input buffer 431-2. Thereby, the output of the processed pixel data DAT2 corresponding to the third unit line from the image processing module 43-2 to the image processing module 33-3 of the subsequent stage is temporarily stopped. The output of the processed pixel data DAT2 of the third unit line from the image processing module 43-2 is resumed at a timing after the control section 434-2 temporarily stores the processed pixel data DAT1 of the third unit line in the input buffer 431-2 and then reads the stored processed pixel data DAT1 and the arithmetic section 433-2 generates the processed pixel data DAT2 of the third unit line by performing the arithmetic operation of the distortion correction process of the distortion aberration thereon. Also, at this time, the processed pixel data DAT2 corresponding to the third unit line output from the image processing module 43-2 is output after being delayed by the latency D2 in the arithmetic section 433-2.

When the processed pixel data DAT2 corresponding to the first unit line is input from the image processing module 43-2 of the previous stage, the image processing module 33-3 transfers the input processed pixel data DAT2 to the arithmetic section 333-3 as it is as in the example of the operation of each processing module in the image processing device 1 of the present invention shown in FIG. 9. Then, the arithmetic section 333-3 outputs the processed pixel data DAT3 generated by performing the noise reduction process on the transferred processed pixel data DAT2 of the first unit line, to the image processing module 33-4 from a timing at which the processed pixel data DAT3 has been delayed by the delay time D3 (latency D3).

Also, at this time, in the image processing module 33-3, as shown in FIG. 12, the output of the processed pixel data DAT2 of the third unit line from the image processing module 43-2 is temporarily stopped and hence, the output of the processed pixel data DAT3 corresponding to the third unit line from the image processing module 33-3 to the image processing module 33-4 of the subsequent stage is temporarily stopped. Also, in the image processing module 33-3, the output of the processed pixel data DAT3 of the third unit line is resumed at a timing after the output of the processed pixel data DAT2 of the third unit line from the image processing module 43-2 is resumed and the arithmetic section 333-3 generates the processed pixel data DAT3 of the third unit line by performing the arithmetic operation of the noise reduction process thereon. Also, at this time, the processed pixel data DAT3 corresponding to the third unit line output from the image processing module 33-3 is output after being delayed by the latency D3 in the arithmetic section 333-3.

Accordingly, a period in which the processed pixel data DAT3 is not input occurs between the second unit line and the third unit line in the image processing module 33-4. The period during which no the processed pixel data DAT3 is input to the image processing module 33-4 is a period of the pipeline stall state in the example of the operation of each processing module shown in FIG. 12.

Also, because the operation of the image processing module 33-4 in the example of the operation of each processing module shown in FIG. 12 is similar to the example of the operation of each processing module in the image processing device 1 of the present invention shown in FIG. 9, the period of the pipeline stall state in which no the processed pixel data DAT3 is input to the image processing module 33-4 also propagates to the processing module of the subsequent stage (for example, the output DMA module 34) of the image processing module 33-4.

If the input data is transferred to the arithmetic section as it is despite the fact that the storage capacity (the remaining storage capacity) available instead of the data buffer provided in another processing module is small as described above, the pipeline stall state occurs in a series of pipeline processing. That is, unless the CPU 50 does not correctly set the path for transferring the input data to the arithmetic section with respect to each processing module constituting the pipeline in the image processing section 30, the pipeline stall state may occur in the configured pipeline.

However, in the image processing device 1 of the present invention, the CPU 50 correctly sets the path for transferring the input data to the arithmetic section with respect to each processing module constituting the pipeline in the image processing section 30 by the above-described method, so that it is possible to perform a series of pipeline processing by avoiding the pipeline stall state in the configured pipeline. Moreover, by using a data buffer provided in any processing module instead of a data buffer provided in another processing module, the CPU 50 can perform control so that the operation of the data buffer provided in another processing module is stopped and it is possible to reduce the power consumption of the stopped data buffer.

According to the present embodiment, an image processing device (the image processing device 1) includes a memory (the DRAM 20), an image processing section (the image processing section 30) and a system control section (the CPU 50), the DRAM 20 and the image processing section 30 being connected to a data bus (the DMA bus 10), the image processing section 30 including a pipeline in which a plurality of processing modules (image processing modules 33-1 to 33-5) is connected in series, each processing modules (the image processing module 33 and the image processing module 43) being configured to perform a predetermined process on input data (pixel data or the processed pixel data), the image processing section 30 performing pipeline processing by the image processing module 33 and the image processing module 43 sequentially performing the process, and the CPU 50 performing setting the pipeline processing to be performed by the image processing section 30, wherein each of the image processing module 33 and the image processing module 43 includes: a data buffer (the input buffer 331 or the input buffer 431) configured to temporarily store the pixel data or the processed pixel data in unit of processing, an arithmetic section (the arithmetic section 333 or the arithmetic section 433) configured to perform an arithmetic operation of the process in accordance with a setting (a processing mode or parameters) of processing content by the CPU 50, and a control section (the control section 334 or the control section 434) configured to select a path within the image processing module 33 or the image processing module 43 by which the pixel data or the processed pixel data is transferred to the arithmetic section 333 or the arithmetic section 433 and control an operation of the input buffer 331 or the input buffer 431 in accordance with a setting of a pixel data or the processed pixel data transfer path by the CPU 50, and wherein the image processing section 30 further includes; a connection switching section (the connection switching section 31) configured to switch a connection between the processing modules (the image processing module 33 and the image processing module 43) constituting the pipeline in accordance with a setting of a pipeline configuration by the CPU 50 is configured.

Also, according to the present embodiment, the image processing device 1 in which at least one processing module among the plurality of the image processing module 33 and the image processing module 43 is a second processing module (the image processing module 43) including a second arithmetic section (the arithmetic section 433) which is the arithmetic section for exclusively performing arithmetic operations of a plurality of predetermined processes, and the CPU 50 performs the setting of the transfer path and the setting of the pipeline configuration on the basis of contents of the process to be performed on the data by the image processing module 43 and a storage capacity of the input buffer 331 or the input buffer 431 provided in the image processing module 33 and the image processing module 43 connected adjacent to the image processing module 43 is configured.

Also, according to the present embodiment, the image processing device 1 in which the CPU 50 sets the arithmetic section 433 and the arithmetic section 333 provided in the adjacently connected image processing module 33 as a single arithmetic section if the remaining storage capacity (buffer region) in the input buffer 431 is present when the image processing module 43 performs the arithmetic operation of the process according to the setting of the processing content, the CPU 50 sets the transfer path of the adjacently connected image processing module 33 to a path along which the pixel data or the processed pixel data bypasses the input buffer 331 and transferred to the arithmetic section 333 without being stored in the input buffer 331, and causes an operation of the input buffer 331 provided in the adjacently connected image processing module 33 to stop if the remaining buffer region is a capacity available instead of the storage capacity of the input buffer 331 provided in the adjacently connected image processing module 33, and the CPU 50 sets the transfer path of the adjacently connected image processing module 33 to a path along which the pixel data or the processed pixel data is read and transferred to the arithmetic section 333 after being temporarily stored in the input buffer 331 if the remaining buffer region is a capacity unavailable instead of the storage capacity of the input buffer 331 provided in the adjacently connected image processing module 33 is configured.

Also, according to the present embodiment, the image processing device 1 in which the CPU 50 calculates the remaining storage capacity (buffer region) of the input buffer 431 provided in the image processing module 43 on the basis of the entire storage capacity of the input buffer 431 and the storage capacity (the interpolation region) of the input buffer 431 used when the image processing module 43 performs the arithmetic operation of the process according to the setting of the processing content is configured.

Also, according to the present embodiment, the image processing device 1 in which the image processing module 33 and the image processing module 43 further include a selector (the selector 332) configured to select either a path along which the pixel data or the processed pixel data read from the input buffer 331 or the input buffer 431 is transferred or a path along which the pixel data or the processed pixel data is transferred by bypassing the input buffer 331 or the input buffer 431, as a path along which the pixel data or the processed pixel data is transferred is configured.

Also, according to the present embodiment, the image processing device 1 in which the pixel data or the processed pixel data is pixel data corresponding to each pixel included in an image, the arithmetic section 433 is an arithmetic section for exclusively performing arithmetic operations of a plurality of processes according to an image interpolation process using a function of conveying coordinates of each pixel included in the image, and the CPU 50 calculates the remaining storage capacity (buffer region) of the input buffer 431 provided in the image processing module 43 on the basis of the entire storage capacity of the input buffer 431 and the storage capacity (the interpolation region) of the input buffer 431 used when the image processing module 43 performs the arithmetic operation of the image interpolation process according to a setting value of the image interpolation process is configured.

Also, according to the present embodiment, the image processing device 1 in which the image interpolation process includes at least a resizing process for changing a size of the image and a distortion correction process of correcting distortion of distortion aberration included in the image is configured.

Also, according to the present embodiment, the image processing device 1 in which the image processing module 33 connected adjacent to the image processing module 43 is connected to a stage subsequent to the image processing module 43 in the pipeline configuration is configured.

Also, according to the present embodiment, there is provided an image processing method in an image processing device (the image processing device 1) includes a memory (the DRAM 20), an image processing section (the image processing section 30), and a system control section (the CPU 50), the DRAM 20 and the image processing section 30 being connected to a data bus (the DMA bus 10), the image processing section 30 including a pipeline in which a plurality of processing modules (image processing modules 33-1 to 33-5) is connected in series, each processing modules (the image processing module 33 and the image processing module 43) being configured to perform a predetermined process on input data (pixel data or the processed pixel data), the image processing section 30 performing pipeline processing by the image processing module 33 and the image processing module 43 sequentially performing the process, and the CPU 50 performing setting the pipeline processing to be performed by the image processing section 30, the image processing method including: an arithmetic step, by each of the image processing module 33 and the image processing module 43, performing an arithmetic operation of the process in according to a selling (a processing mode or parameters) of processing content by the CPU 50; a control step, by each of the image processing module 33 and the image processing module 43, selecting a path within the image processing module 33 or the image processing module 43 by which the pixel data or the processed pixel data is transferred to the arithmetic section (the arithmetic section 333 or the arithmetic section 433) and controlling an operation of an input buffer (the input buffer 331 or the input buffer 431) configured to temporarily store the pixel data or the processed pixel data in unit of processing in accordance with a setting (the parameters) of a pixel data or the processed pixel data transfer path by the CPU 50; and a connection switching step, by the image processing section 30, switching a connection between the processing modules (the image processing module 33 and the image processing module 43) constituting the pipeline in accordance with a setting of a pipeline configuration by the CPU 50.

As described above, according to each embodiment of the present invention, the image processing section provided in the image processing device is provided with a connection switching section configured to switch a connection of each processing module, that is, switch a connection of the pipeline constituting the image processing section. Thereby, in each of the embodiments of the present invention, it is possible to switch the connection of the processing module within the image processing section and change (switch) a path of data flowing into the pipeline every time the image processing (the pipeline processing) to be executed by the image processing section provided in the image processing device is determined.

Also, according to each embodiment of the present invention, in the image processing section provided in the image processing device, each of a plurality of processing modules constituting the pipeline includes a component element for selecting (switching) a path which reads after being temporarily stored the input data, which has been input, in the data buffer and transferred to the arithmetic section or a path along which the data bypasses the data buffer and transferred to the arithmetic section. Thereby, in each of the embodiments of the present invention, it is possible to change (switch) a path of input data flowing within each of the processing modules every time the image processing (the pipeline processing) to be executed by the image processing section provided in the image processing device is determined. At this time, in each of the embodiments of the present invention, arithmetic sections provided in the plurality of processing modules constituting the pipeline in the image processing section function as a single arithmetic section according to the image processing (the pipeline processing) to be executed by the image processing section. Then, if a plurality of arithmetic sections function as a single arithmetic section in each of the embodiments of the present invention, the storage capacity remaining without being used in the arithmetic operation of the image processing in a processing module including a data buffer having a large storage capacity is used instead of the data buffer provided in another processing module which the arithmetic sections to function as the single arithmetic section. That is, in each of the embodiments of the present invention, the storage capacity remaining without being used in the arithmetic operation of the image processing is provided as the storage capacity of a data buffer provided in another processing module. Further, in each of the embodiments of the present invention, control is performed so that input data is transferred in a path along which the input data bypasses a data buffer provided in a processing module in which the storage capacity of the data buffer is provided, and an operation of a data buffer is stopped. Thereby, in each of the embodiments of the present invention, it is possible to reduce power consumption in a data buffer whose operation is stopped. Thereby, in each of the embodiments of the present invention, it is possible to perform desired image processing even when writing of data to a data buffer and reading of data from a data buffer are not necessarily performed like when the pipeline is configured in the conventional processing module, and it is possible to reduce the power consumption in pipeline processing without deteriorating the performance of pipeline processing. That is, in each of the embodiments of the present invention, it is possible to reduce power consumption in pipeline processing without deteriorating the performance of the pipeline processing when desired image processing is performed according to the pipeline processing by each processing module provided in the image processing modules constituting the pipeline in the image processing section function as a single arithmetic section according to the image processing (the pipeline processing) to be executed by the image processing section. Then, if a plurality of arithmetic sections function as a single arithmetic section in each of the embodiments of the present invention, the storage capacity remaining without being used in the arithmetic operation of the image processing in a processing module including a data buffer having a large storage capacity is used instead of the data buffer provided in another processing module which the arithmetic sections to function as the single arithmetic section. That is, in each of the embodiments of the present invention, the storage capacity remaining without being used in the arithmetic operation of the image processing is provided as the storage capacity of a data buffer provided in another processing module. Further, in each of the embodiments of the present invention, control is performed so that input data is transferred in a path along which the input data bypasses a data buffer provided in a processing module in which the storage capacity of the data buffer is provided, and an operation of a data buffer is stopped. Thereby, in each of the embodiments of the present invention, it is possible to reduce power consumption in a data buffer whose operation is stopped. Thereby, in each of the embodiments of the present invention, it is possible to perform desired image processing even when writing of data to a data buffer and reading of data from a data buffer are not necessarily performed like when the pipeline is configured in the conventional processing module, and it is possible to reduce the power consumption in pipeline processing without deteriorating the performance of pipeline processing. That is, in each of the embodiments of the present invention, it is possible to reduce power consumption in pipeline processing without deteriorating the performance of the pipeline processing when desired image processing is performed according to the pipeline processing by each processing module provided in the image provided in each processing module may be a configuration in which a plurality of unit line storage regions 4311, each of which corresponds to one unit line as shown in (a) of FIG. 5, are configured. Thus, the configuration of the data buffer may be configured to control the operation for each unit line storage region 4311 or each of a predetermined number of unit line storage regions 4311. In the case of this configuration, control can be performed so that the operation of the unit line storage region 4311 is stopped for every unit in which the operation is controlled in the data buffer.

In each of the embodiments of the present invention, a configuration in which a function of controlling the selection (switching) of whether or not to cause the data to bypass the data buffer provided in the image processing module itself is provided in each image processing module constituting the pipeline in the image processing section provided in the image processing device has been described. However, as described above, the data buffer is also provided in the input DMA module and the output DMA module which are processing modules constituting the pipeline in the image processing section. Accordingly, similar to the image processing module, the input DMA module and the output DMA module may also have a function of controlling the selection (switching) of whether or not to cause the data to bypass data buffers provided itself. By providing this function, advantageous effects similar to those of the image processing module can be obtained in the input DMA module and the output DMA module.

Also, in each embodiment of the present invention, the configuration in which each processing module constituting the pipeline is provided in the image processing section provided in the image processing device has been described. However, various processing devices other than an image processing device are conceivable as the processing device that performs a series of processes according to the pipeline configuration. Accordingly, the processing device to which the concept of the present invention can be applied is not limited to the image processing device shown in each embodiment of the present invention, and it is possible to similarly apply the concept of the present invention and obtain advantageous effects similar to those of the present invention as long as any processing device for performing the pipeline processing by connecting a plurality of processing modules in series to configure the pipeline is provided.

While preferred embodiments of the present invention have been described and shown above, the invention is not limited to the embodiments and modified examples thereof. Within a range not departing from the gist or spirit of the present invention, additions, omissions, substitutions, and other modifications to the configuration can be made.

Also, the present invention is not to be considered as being limited by the foregoing description, and is limited only by the scope of the appended claims.

What is claimed is:

1. An image processing device that includes a memory, an image processing section and a system control section, the memory and the image processing section being connected to a data bus, the image processing section including a pipeline in which a plurality of processing modules is connected in series, each processing modules being configured to perform a predetermined process on input data, the image processing section performing pipeline processing by the processing modules sequentially performing the process, the system control section performing setting the pipeline processing to be performed by the image processing section,
wherein each of the processing modules includes:
a data buffer configured to temporarily store the data in unit of processing,
an arithmetic section configured to perform an arithmetic operation of the process in accordance with a setting of processing content by the system control section, and
a control section configured to select a path within the processing module by which the data is transferred to the arithmetic section and control an operation of the data buffer in accordance with a setting of a data transfer path by the system control section,
wherein the image processing section further includes:
a connection switching section configured to switch a connection between the processing modules constituting the pipeline in accordance with a setting of a pipeline configuration by the system control section, wherein at least one processing module among the plurality of processing modules is a second processing module including a second arithmetic section which is the arithmetic section for exclusively performing arithmetic operations of a plurality of predetermined processes, and wherein the system control section performs the setting of the transfer path and the setting of the pipeline configuration on the basis of contents of the process to be performed on the data by the second processing module and a storage capacity of the data buffer provided in the processing module connected adjacent to the second processing module.

2. The image processing device according to claim 1, wherein the system control section sets the second arithmetic section and the arithmetic section provided in the adjacently connected processing module as a single arithmetic section if remaining storage capacity in the data buffer is present when the second processing module performs the arithmetic operation of the process according to the setting of the processing content, wherein the system control section sets the transfer path of the adjacently connected processing module to a path along which the data bypasses the data buffer and transferred to the arithmetic section without being stored in the data buffer, and causes an operation of the data buffer provided in the adjacently connected processing module to stop if the remaining storage capacity is a capacity available instead of the storage capacity of the data buffer provided in the adjacently connected processing module, and wherein the system control section sets the transfer path of the adjacently connected processing module to a path along which the data is read and transferred to the arithmetic section after being temporarily stored in the data buffer if the remaining storage capacity is a capacity unavailable instead of the storage capacity of the data buffer provided in the adjacently connected processing module.

3. The image processing device according to claim 2, wherein the system control section calculates the remaining storage capacity of the data buffer provided in the second processing module on the basis of the entire storage capacity of the data buffer and the storage capacity of the data buffer used when the second processing module performs the arithmetic operation of the process according to the setting of the processing content.

4. The image processing device according to claim 1, wherein the processing module and the second processing module further include a selector configured to select either a path along which the data read from the data buffer is transferred or a path along which the data is transferred by bypassing the data buffer, as a path along which the data is transferred.

5. The image processing device according to claim 1, wherein the data is pixel data corresponding to each pixel included in an image, wherein the second arithmetic section is an arithmetic section for exclusively performing arithmetic operations of a plurality of processes according to an image interpolation process using a function of converting coordinates of each pixel included in the image, and wherein the system control section calculates the remaining storage capacity of the data buffer provided in the second processing module on the basis of the entire storage capacity of the data buffer and the storage capacity of the data buffer used when the second processing module performs the arithmetic operation of the image interpolation process according to a setting value of the image interpolation process.

6. The image processing device according to claim 5, wherein the image interpolation process includes at least a resizing process for changing a size of the image and a distortion correction process of correcting distortion of distortion aberration included in the image.

7. The image processing device according to claim 1, wherein the processing module connected adjacent to the second processing module is connected to a stage subsequent to the second processing module in the pipeline configuration.

8. An image processing method in an image processing device that includes a memory, an image processing section and a system control section, the memory and the image processing section being connected to a data bus, the image processing section including a pipeline in which a plurality of processing modules is connected in series, each processing modules being configured to perform a predetermined process on input data, the image processing section performing pipeline processing by the processing modules sequentially performing the process, and the system control section performing setting the pipeline processing to be performed by the image processing section, the image processing method comprising:

an arithmetic step, by an arithmetic section of the processing modules, performing an arithmetic operation of the process in according to a setting of processing content by the system control section;

a control step, by a control section of the processing modules, selecting a path within the processing module by which the data is transferred to the arithmetic section and controlling an operation of a data buffer configured to temporarily store the data in unit of processing in accordance with a setting of a data transfer path by the system control section;

a connection switching step, by the image processing section, switching a connection between the processing modules constituting the pipeline in accordance with a setting of a pipeline configuration by the system control section;

wherein at least one processing module among the plurality of processing modules is a second processing module including a second arithmetic section which is the arithmetic section for exclusively performing arithmetic operations of a plurality of predetermined processes, and wherein the setting of the transfer path and the setting of the pipeline configuration is performed by the system control section on the basis of contents of the process to be performed on the data by the second processing module and a storage capacity of the data buffer provided in the processing module connected adjacent to the second processing module.

* * * * *